US012531452B2

(12) United States Patent
Wahab et al.

(10) Patent No.: US 12,531,452 B2
(45) Date of Patent: Jan. 20, 2026

(54) MANUFACTURING AND ASSEMBLING STATOR ASSEMBLIES

(71) Applicant: Indigo Technologies, Inc., Woburn, MA (US)

(72) Inventors: Adam Wahab, Cambridge, MA (US); Scott T. Purchase, Cambridge, MA (US); Peter Madden, Reading, MA (US); Grant W. Kristofek, Wayland, MA (US)

(73) Assignee: Indigo Technologies, Inc., Woburn, MA (US)

( * ) Notice: Subject to any disclaimer, the term of this patent is extended or adjusted under 35 U.S.C. 154(b) by 345 days.

(21) Appl. No.: 18/170,240

(22) Filed: Feb. 16, 2023

(65) Prior Publication Data

US 2023/0318389 A1    Oct. 5, 2023

Related U.S. Application Data

(63) Continuation of application No. PCT/US2021/046148, filed on Aug. 16, 2021.
(Continued)

(51) Int. Cl.
*H02K 3/34* (2006.01)
*H02K 3/50* (2006.01)

(52) U.S. Cl.
CPC ............ *H02K 3/345* (2013.01); *H02K 3/34* (2013.01); *H02K 3/50* (2013.01)

(58) Field of Classification Search
CPC .......... H02K 5/225; H02K 3/522; H02K 3/30; H02K 3/345; H02K 3/34; H02K 3/50; H02K 15/105; Y02T 10/64
(Continued)

(56) References Cited

U.S. PATENT DOCUMENTS 2,417,746 A * 3/1947 Fletcher ................. H02K 3/345
62/DIG. 13
3,235,654 A   2/1966 Eldridge
(Continued)

FOREIGN PATENT DOCUMENTS

JP    2006311706 A   11/2006
JP      5419956 B2    2/2014
(Continued)

OTHER PUBLICATIONS

International Search Report and Written Opinion in International Patent Application No. 21/46148 mailed Feb. 7, 2022, 14 pages.
(Continued)

*Primary Examiner* — Alexander A Singh
(74) *Attorney, Agent, or Firm* — Smith Baluch LLP

(57) ABSTRACT

A stator assembly typically includes at least one stator core assembly that generates a magnetic field to rotate a rotor. The stator core assembly includes a core and a coil wrapped around the core to receive a current thus generating the magnetic field. To improve the performance and manufacturability of the stator assembly, a stator core assembly may include an insulator, disposed between the coil and the core, formed as a single flat sheet. A flat manufacturing process allows greater control of the insulator geometry, a broader range of materials to form the insulator, and patterning of structural features into the insulator to improve assembly and performance. The coil of the stator core assembly may also be electrically coupled to a bus bar using a fastener process and/or a crimping process that consumes less energy and occurs at lower temperatures than conventional soldering or welding processes.

20 Claims, 27 Drawing Sheets

Related U.S. Application Data

(60) Provisional application No. 63/066,387, filed on Aug. 17, 2020.

(58) Field of Classification Search
USPC .......................................... 310/214, 215, 71
See application file for complete search history.

(56) References Cited

U.S. PATENT DOCUMENTS

| | | | |
|---|---|---|---|
| 3,354,517 | A | 11/1967 | Levinsky |
| 4,217,690 | A | 8/1980 | Morreale |
| 6,376,947 | B1 | 4/2002 | Tateishi |
| 7,518,853 | B2 | 4/2009 | Kato et al. |
| 9,160,217 | B2 | 10/2015 | Nakagawa |
| 9,973,051 | B2 | 5/2018 | Ogawa |
| 2002/0084713 | A1 | 7/2002 | Kuroyanagi |
| 2007/0273221 | A1 | 11/2007 | Kinoshita et al. |
| 2007/0278876 | A1* | 12/2007 | Haga ................ H02K 3/325 310/260 |
| 2010/0068916 | A1* | 3/2010 | Chen ................ H01R 4/2429 439/391 |
| 2010/0119388 | A1 | 5/2010 | Zeinlinger et al. |
| 2014/0175935 | A1 | 6/2014 | Tsuchiya et al. |
| 2017/0005552 | A1 | 1/2017 | Tsuchiya et al. |
| 2020/0220410 | A1 | 7/2020 | Ishida et al. |

FOREIGN PATENT DOCUMENTS

| | | |
|---|---|---|
| JP | 5523391 B2 | 6/2014 |
| WO | 2019241765 A1 | 12/2019 |

OTHER PUBLICATIONS

Whitley "The mechanics of pressure connections." EDN Regional Engineers Meeting, New York. Dec. 3, 1964 10 pages.

* cited by examiner

MANUFACTURING AND ASSEMBLING STATOR ASSEMBLIES

CROSS-REFERENCE TO RELATED APPLICATIONS

The present application is a bypass continuation of International Application No. PCT/US2021/046148, filed Aug. 16, 2021, which claims the priority benefit, under 35 U.S.C. 119 (e), to U.S. Application No. 63/066,387, filed Aug. 17, 2020, each of which is incorporated by reference herein in its entirety for all purposes.

BACKGROUND

Electric motors are used in a broad range of applications including vehicle propulsion (e.g., an electric car, a hybrid car, an electric bicycle), industrial machinery (e.g., a fan, a refrigerator, a pump), and household items (e.g., a vacuum cleaner, a drill, a washing machine). A typical electric motor includes a stator assembly to generate a magnetic field and a rotor that rotates in response to the magnetic field. In some electric motors, the stator assembly may be an electromagnet with at least one core and a corresponding coil (e.g., a copper wire) wound around the core. An electric current may be applied to the coil to produce a magnetic field. Depending on the geometry of the coil, the magnetic field may be concentrated in the core. For high power density applications (e.g., an electric car), the core may be formed from a magnetic material (e.g., a material having a high magnetic permeability) to further increase the magnetic field applied to the rotor. In high switching frequency and/or low mass applications, the core may be formed from a non-magnetic material (e.g., a material having a low magnetic permeability).

The stator assembly may generally include multiple cores and coils mounted to a support structure (e.g., a disk or annular plate) with different arrangements depending on the type of electric motor. For example, in a radial flux motor, the cores and coils are arranged circumferentially around a rotor. In an axial flux motor, the cores and coils are arranged on a plane that intersects the rotation axis of the rotor. FIGS. 1A-1C show an example of a stator assembly 100a previously used in an axial flux motor. FIG. 1A shows the stator assembly 100a may include an array of stator core assemblies 110 distributed about a rotation axis 102. The rotation axis 102 may coincide with the rotation axis of a rotor (not shown) being driven by the axial flux motor. A support structure 104 may mechanically support each stator core assembly 110 in the stator assembly 100a.

FIG. 1B shows a cross-sectional view of a stator core assembly 110 in the stator assembly 100a. As shown, the stator core assembly 110 includes a core 120 and a coil 130 wrapped around at least one side of the core 120. The core 120 is mounted to the support structure 104 via a fastener 106. The stator core assembly 110 may also include a potting compound 140 to seal the core 120 and the coil 130 from the environment once the coil 130 is assembled to the core 120. An electric current may be passed through the coil 130 to generate a magnetic field to drive the rotor (not shown). In the stator assembly 100a shown in FIGS. 1A-IC, the coil 130 includes a wire 132 (see the cross-sectional view in FIG. 1C) that is wound around the core 120 in a series of concentric loops about a winding axis 134 that is parallel to the rotation axis 102. In this manner, the portion of the magnetic field generated by the coil 130 that is used to drive the rotor is also substantially parallel with the rotation axis 102. The magnetic field also passes through the core 120, which in some designs may be formed from a magnetic material with a sufficiently large magnetic permeability to amplify the magnetic field, thus increasing the torque generated by the motor.

The manufacture and assembly of the electric motor is dictated, in part, by the design and integration of the coil and the core. For example, the coil, which is typically formed from a copper wire, and the core may both be electrically conducting. The wire of the coil is typically wound around the core with multiple turns or windings. Each winding of the coil should be electrically insulated from neighboring windings to prevent an electrical short circuit, which may cause a reduction in motor torque and/or unwanted heating due to excess current in response to the reduced electrical impedance. Additionally, the coil should also be electrically insulated from the core to prevent the core from becoming energized, which may pose a risk of electrical shock, overbiasing, and/or reverse biasing circuits sharing a common ground with the motor. An electrical short circuit between the coil and the core may also create a low-impedance path for current to flow, which may cause the coil and/or the drive electronics to fail due to an overcurrent. This failure may be compounded if several short circuits occur between the multiple coils in the stator assembly.

In conventional electric motors, the wire typically has a thin layer of electrical insulation. The electrical insulation, however, is often quite fragile and thus susceptible to damage during assembly. For example, the electrical insulation on sections of the wire closest to the core (e.g., the first layer of windings around the core 120 in FIG. 1C) are especially susceptible to damage due to the large abrasive forces that occur when the wire touches the core.

As a result, an insulator is often placed between the core and the coil to provide additional electrical insulation. Although the additional electrical insulation provided by the insulator is desirable, conventional insulators exhibit several limitations that hinder the manufacturing and performance of an electric motor. For instance, a conventional insulator is typically formed via a molding process where the use of one or more molds may add additional costs for manufacture.

Additionally, heat generated by the core is often dissipated to an external heat sink through the coil. A conventional insulator, however, is typically manufactured using excess material (e.g., a larger thickness) that results in thermal resistance between the coil and the core. This increased thermal resistance limits the conductive heat transfer often required to dissipate thermal energy by the coils due to Joule heating during operation of the motor. Insufficient cooling of the coils ultimately results in a reduction in the power output rating of the motor.

Furthermore, conventional insulators are often formed from materials that are susceptible to being torn and/or otherwise damaged when placed on the core during assembly, thus compromising the electrical insulation of the insulator and the placement of the coil with respect to the core. Furthermore, thin insulators used in high-performance motors often include one or more layers of adhesive-backed polyimide tape that are applied directly to the cores. The application of the polyimide tape is often a time-consuming, manual process.

In order to receive an electric current, each coil in the stator core assembly may be electrically connected to two or more electrical buses. Each electrical bus, in turn, may receive an electric current from a current source, such as an inverter power stage in a motor drive. Thus, the electrical bus may distribute the electric current among the various coils in the electric motor.

The electrical insulation of the stator wire and/or the wire conductor itself may also be damaged when terminating the wire leads of a coil to bus bars. Often, the leads from each coil are soldered directly or indirectly to the bus bar depending on the size of the bus bar. For instance, the bus bar in some electric motors may be substantially larger in size than the wire, resulting in a large mismatch in thermal mass between the wire and the bus bar. The amount of thermal energy used to sufficiently raise the temperature of the bus bar for soldering and/or welding may overheat the wire, thus damaging the electrical insulation on the wire. If wires from multiple coils are soldered to the bus bar in succession, the cumulative heating of the bus bar may also melt previously formed solder joints and/or damage the electrical insulation of the wires already connected to the bus bar. For such motors, several approaches have been previously demonstrated to reduce the large mismatch in thermal mass between the coil and the bus bar.

FIG. 2A shows the stator assembly 100a with an intermediate bus bar 152 where the wire 132 from the coil 130 is first coupled to the intermediate bus 152 and the intermediate bus 152 is then coupled to the bus bar 150. In this example, the stator assembly 100a includes three bus bars 150 that provide the electrical connections for a three-phase stator. The intermediate bus 152 may be smaller in size and/or include metal contact pads to provide a thermal mass similar to the wire 132, thus reducing excess heating during assembly. The intermediate bus 152 may connect to a subset of the coils in the electric motor, thus multiple intermediate buses may be used to connect all the coils in the electric motor. The intermediate bus bar 152 may be electrically coupled to the bus bar 150 using various electrical connections. For example, the intermediate bus bar 152 may be fastened to a terminal of one bus bar 150 using an electrically conductive fastener.

FIG. 2B shows another conventional stator assembly 100b configured as a radial flux motor. Similar to the stator assembly 100a, the stator assembly 100b includes multiple stator core assemblies 110 that each have a coil 130. The wire 132 of each coil 130 includes leads 136 that are welded to a bus bar 150 via bus bar tabs 154. In this example, the bus bar tabs 154 act as fins that extend out of the bus bar 150, which gives rise to a temperature gradient along the length of the fin (the bus bar tab 154). Depending on the geometry of the bus bar tab 154, the portion of the bus bar tab 154 connected to the lead 136 may be more easily heated to higher temperatures than the bulk of the bus bar tab 150.

FIG. 2C shows another conventional stator assembly 100c that does not contain a bus bar 150. Instead, each lead 136 of each wire 132 is hairclip-welded to another lead 136 of another wire 132. In this example, the large mismatch in thermal mass between the wire 132 and the bus bar 150 is obviated by directly connecting similar wires 132 together. However, this approach may also lead to larger electrical resistances and, hence, greater parasitic heating during operation since the wires 132 from several stator core assemblies 110 are now connected in series (the stator assemblies 100a and 100b allowed for parallel connections).

Although FIGS. 2A-2C show several approaches to address the challenges of connecting the coil 130 to an electrical power source, these approaches still rely on a high temperature process (e.g., welding, soldering) to join the wire 132 to the power source. The exposure of the wire 132 to such high temperatures invariably creates a risk of damaging the electrical insulation. Additionally, soldering and/or high temperature welding may entail use of additional chemicals (e.g., flux, inert gas), which may be toxic and/or environmentally polluting. Furthermore, the energy expended to provide sufficient heating in a soldering or welding process is generally not recoverable.

SUMMARY

The present disclosure is directed to various exemplary methods and apparatuses of manufacturing and assembling a stator assembly for an electric motor. In one aspect, an insulator is used to facilitate the manufacture of the coil and assembly onto a core. The insulator may be used as a bobbin for winding a wire to form the coil. The insulator may be formed from a thin sheet that is cut and folded into a shape conforming to the core. The use of a thin sheet may simplify manufacture of the bobbin by enabling use of flat manufacturing processes (e.g., a roll-to-roll process, stamping process).

These processes may also enable several structural features to be incorporated into the insulator, including an aperture (also referred to herein as a "window" or an "opening") that allows the coil to directly contact the core (e.g., along portions of the coil where the electrical insulation of the wire is less prone to damage), alignment features to align the insulator to the core, guide features (e.g., creases or ridges) to guide the wire being wound about the insulator, structural features to increase the stiffness of the insulator during handling, and runoff features to insulate portions of the wire that pass over a flange and/or an edge of the core. In some cases, one or more of these features may be integrated into the insulator in a single manufacturing step.

The insulator may be formed from a material (e.g., fish paper, polyimide film) that provides sufficient mechanical strength to withstand abrasive forces incurred during winding of the wire in forming the coil and/or placement onto the core, thus reducing or mitigating tearing. An adhesive and/or a bonding agent may also be applied to ensure the insulator retains a desired shape and/or to bond the coil to the insulator. Unlike previous insulators, the insulator described herein may be a unitary component formed using fewer and simpler fabrication processes.

In another aspect, a bus bar terminates the wires forming the coil. The bus bar may allow a connection to a wire using a relatively lower energy and lower temperature attachment technique than soldering and/or welding. In one example, the bus bar may include an opening whose perimeter is formed by a pair of overlapping or intersecting circles, where the first circle defines a wire opening to receive the wire and the second circle defines a fastener opening to receive a fastener. Once the wire is in the part of the opening defined by the first circle, a fastener (e.g., a set screw, a cap screw, a flathead screw, a bolt, or a rivet) may be inserted into the part of the opening corresponding to the second circle. (The part of the opening corresponding to the second circle may be threaded to receive the fastener.) Due to the overlap, screwing the fastener into the part of the opening corresponding to the second circle plastically deforms the wire, thus securing the wire to the bus bar.

In another example, the bus bar may have a crimp feature to facilitate crimping of the wire to the bus bar. The crimp feature may include an opening formed into the bus bar and compliant features formed into the bus bar near the opening. Once the wire is inserted into the opening, the compliant features may be deformed via an external force (e.g., a hammer is pressed against the bus bar, which functions as an anvil, causing the wire and the bus bar to form a cold weld.

In both approaches, the wire can be attached to the bus bar without using any chemicals. Both approaches may also be performed at relatively low temperatures (e.g., room temperature), thus reducing the amount of energy consumed to connect each wire to the bus bar and the risk of damaging the wire and/or the electrical insulation on the wire. The wires may also be directly connected to the bus bar regardless of the relative difference in size between the bus bar and the wire. This may eliminate the use of an intermediate bus entirely, thus further simplifying assembly of the electric motor.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
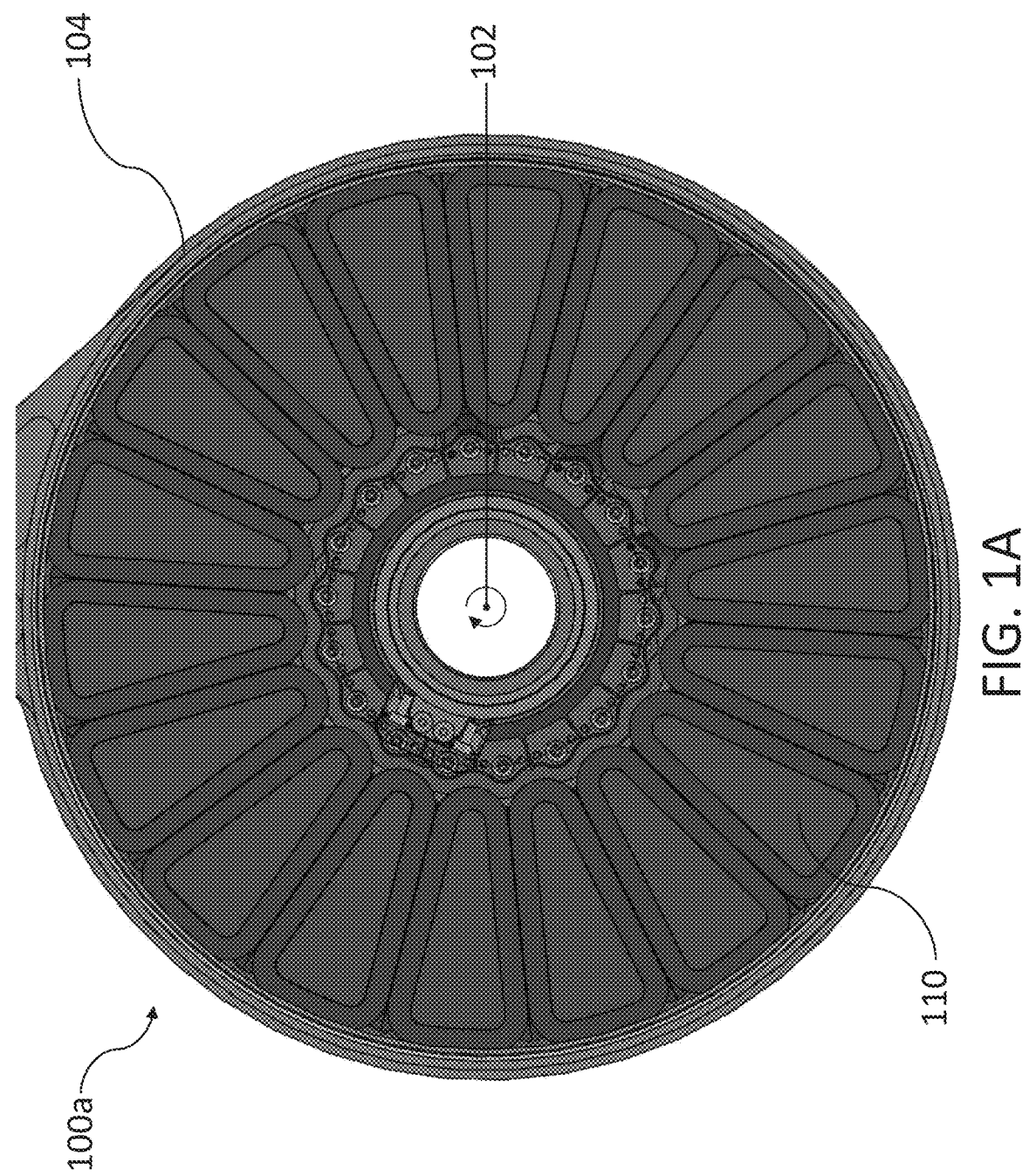
FIG. 1A shows a plan view of a conventional stator assembly.
Figure 1B:
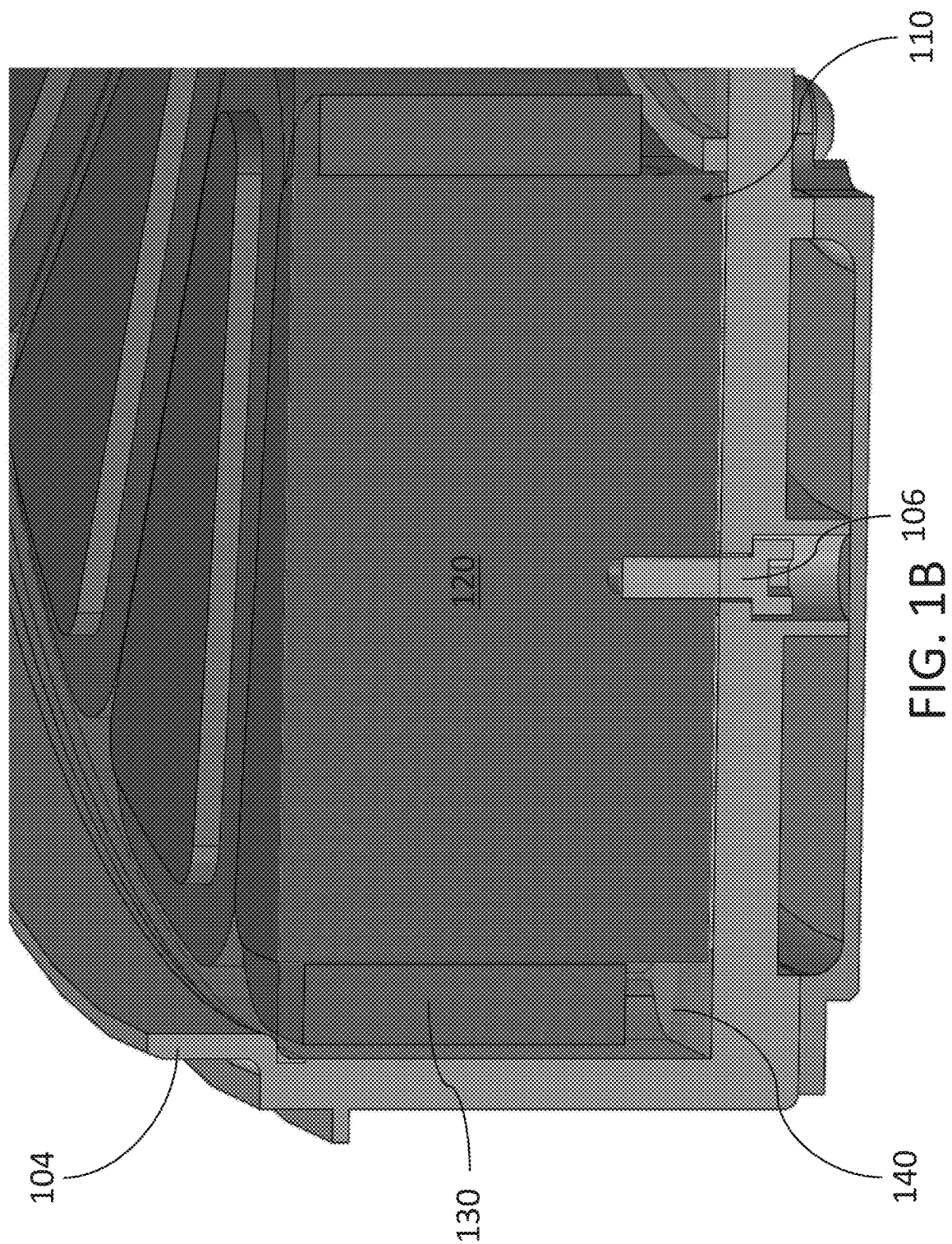
FIG. 1B shows a perspective cross-sectional view of a stator core assembly in the stator assembly of FIG. 1A.
Figure 1C:
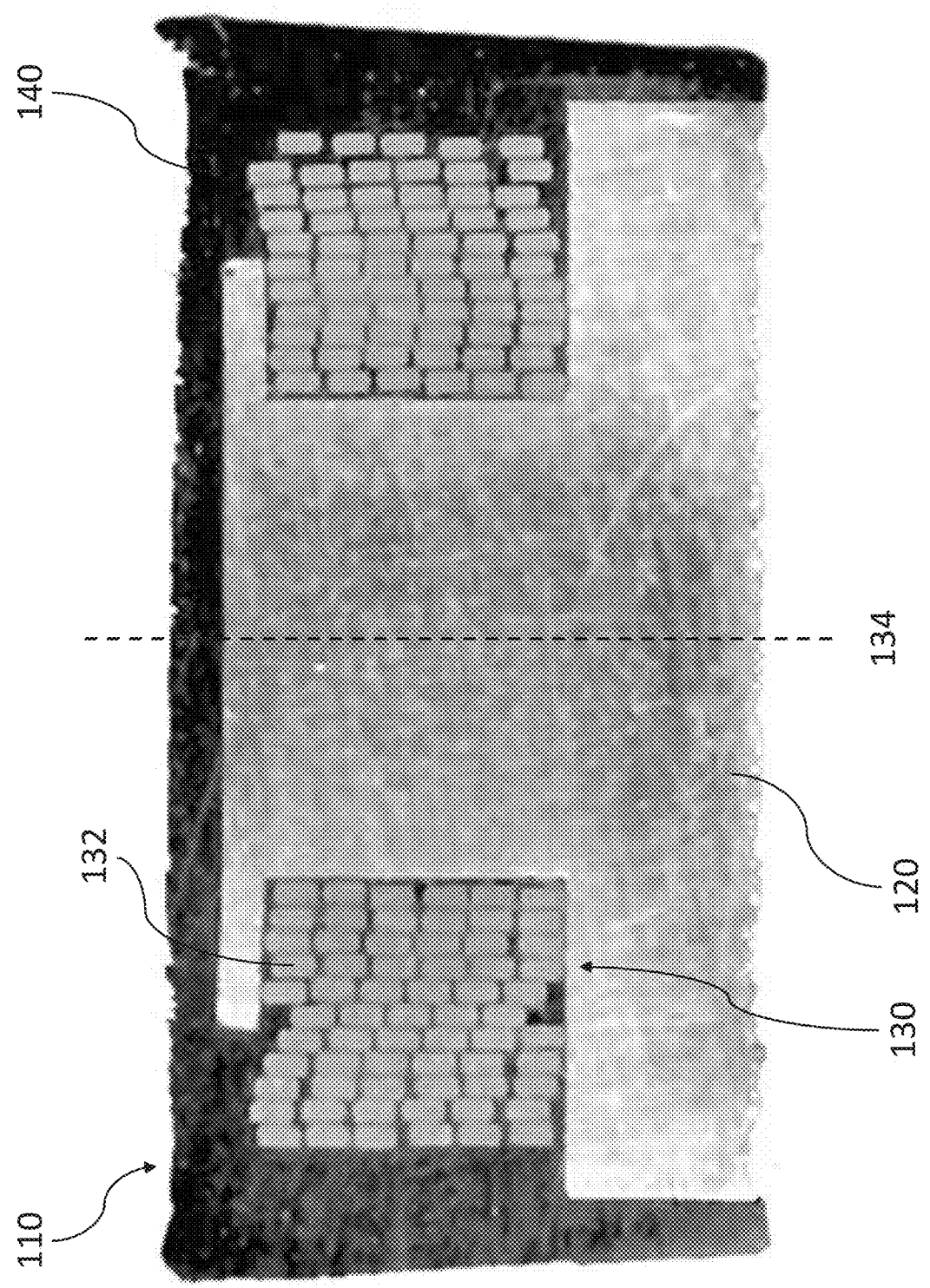
FIG. 1C shows a cross-sectional profile view of another conventional stator core assembly.
Figure 2A:
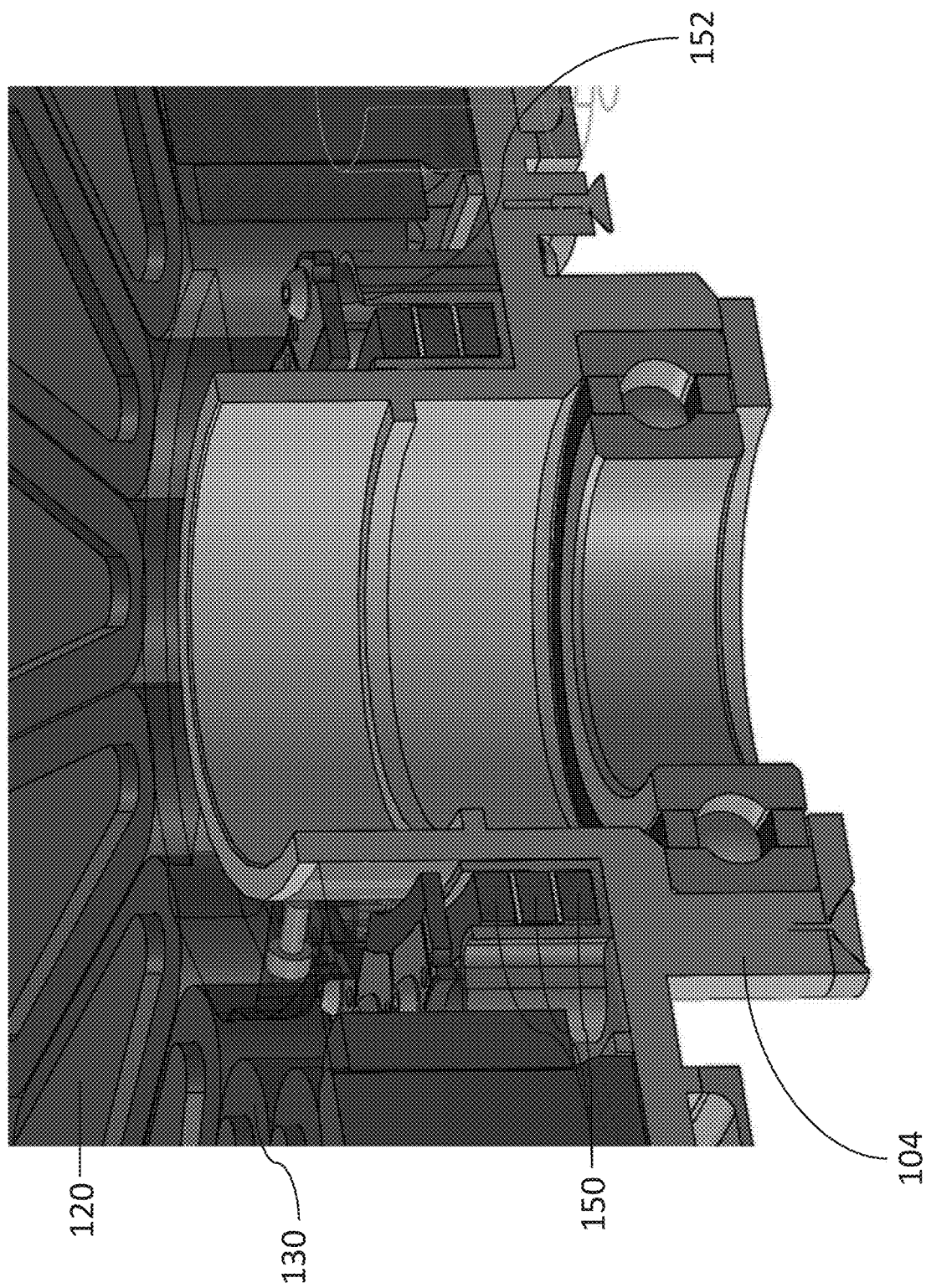
FIG. 2A shows a perspective cross-sectional view of another conventional stator assembly.
Figure 2B:
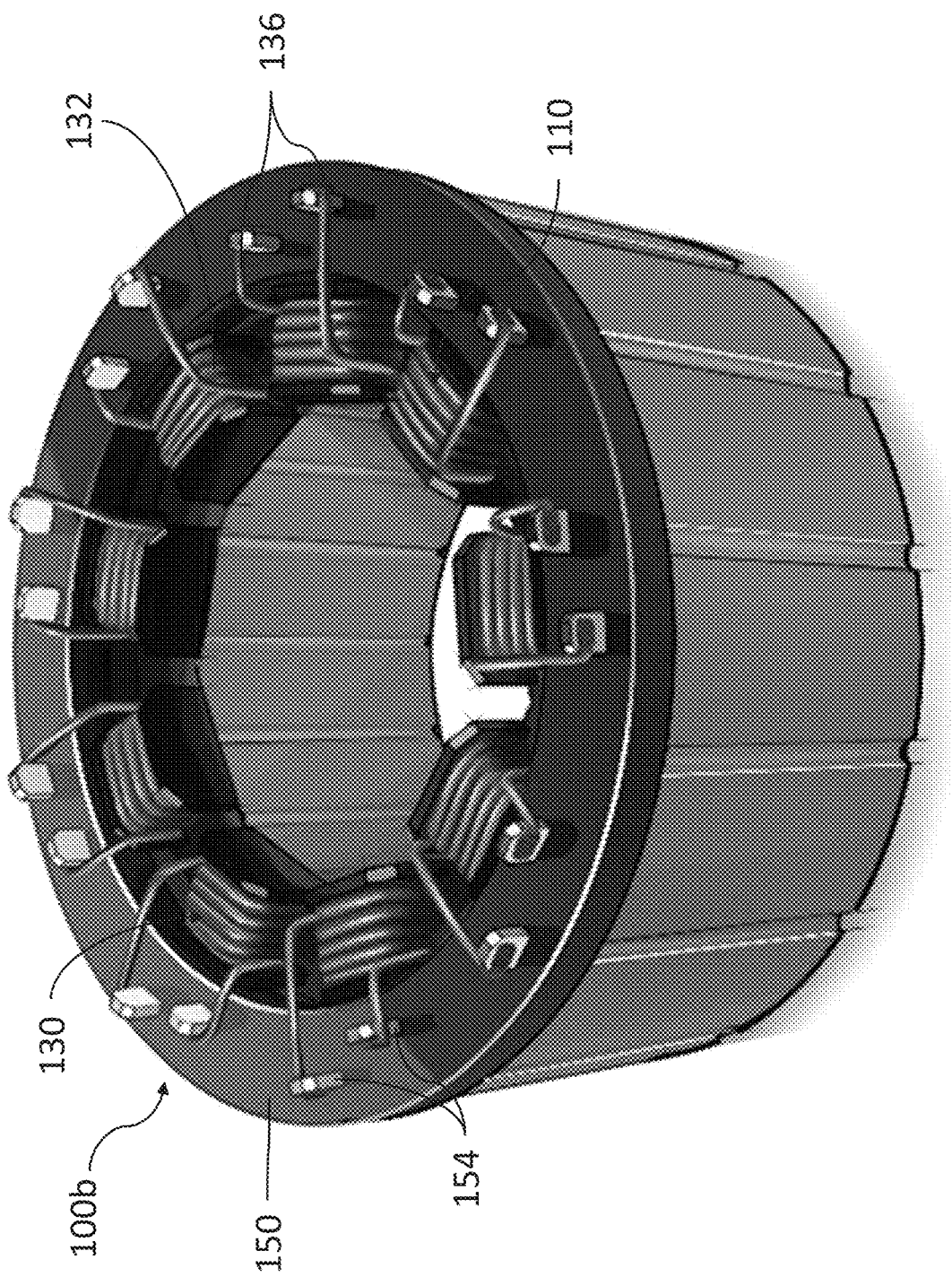
FIG. 2B shows a conventional approach to connecting wires to corresponding bus bars using bus bar tabs.
Figure 2C:
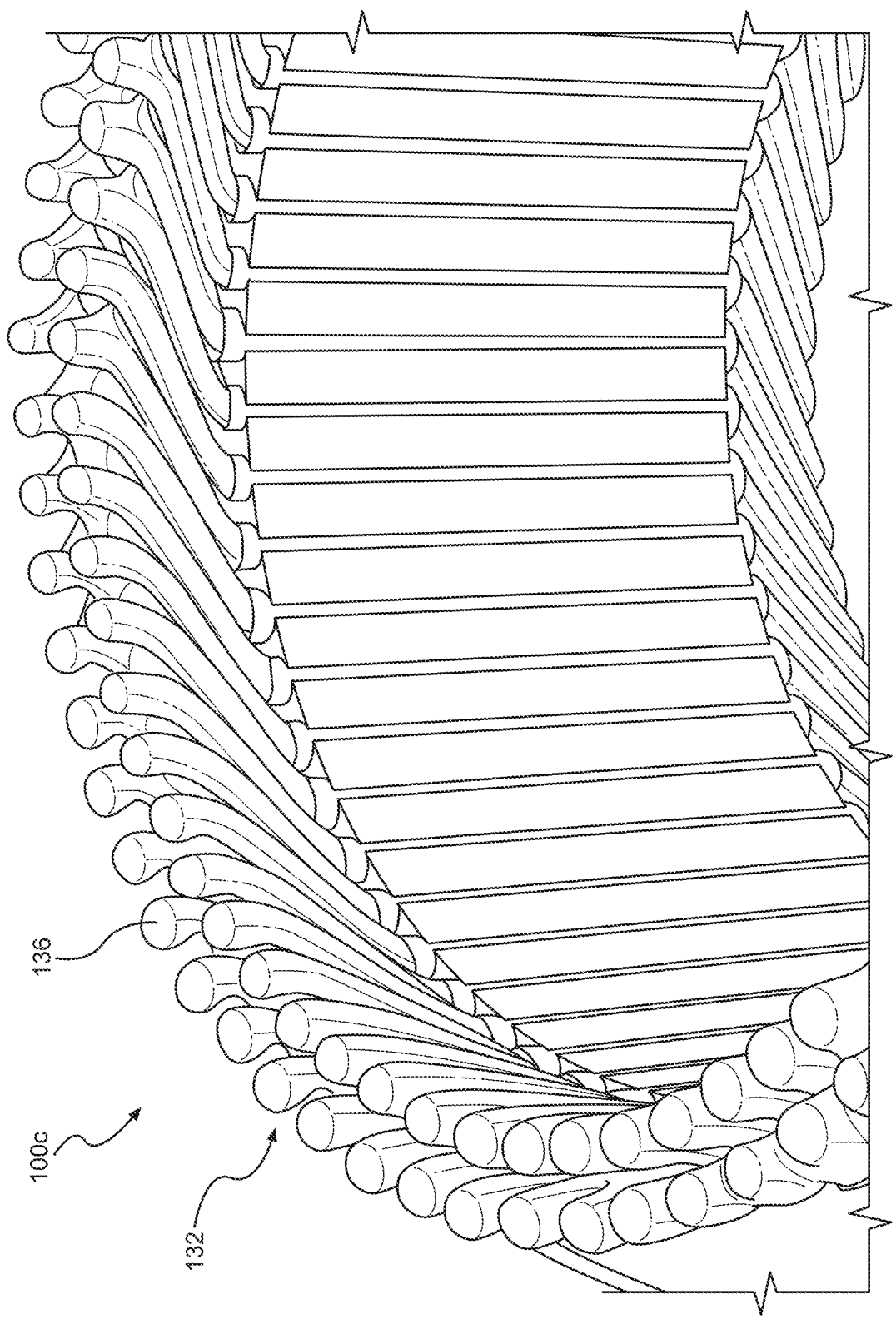
FIG. 2C shows a conventional approach to connecting wires together via a hairclip weld.

Following below are more detailed descriptions of various concepts related to, and implementations of a stator assembly with a core, a coil, an insulator, and a bus bar, methods of manufacturing and integrating the insulator into the stator assembly, and methods of connecting the wire forming the coil to the bus bar. The concepts introduced above and discussed in greater detail below may be implemented in multiple ways. Examples of specific implementations and applications are provided primarily for illustrative purposes to enable those skilled in the art to practice the implementations as well as any alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive stator core assemblies and stator assemblies are provided, wherein a given example or set of examples showcases one or more particular features of a core, an insulator, a coil, and a bus bar. One or more features discussed in connection with a given example of a stator core assembly or a stator assembly may be employed in other examples of stator core assemblies or stator assemblies according to the present disclosure, such that the various features disclosed herein may be readily combined in a given stator core assembly or stator assembly according to the present disclosure (provided that these features are compatible with each other).

Certain dimensions and features of the stator core assembly and/or the stator assembly are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Stator Assemblies and Stator Assembly Manufacturing

The present disclosure is directed to various stator assemblies with one or more stator core assemblies as well as methods of manufacturing and assembling a stator assembly for an electric motor to address the shortcomings of conventional stator assemblies and manufacturing techniques. Some of the stator core assemblies feature an insulator that may be formed as a unitary component or single sheet of material using simpler, more scalable flat manufacturing processes. For example, the insulator can be formed from a flat sheet that is folded or bent around the core, allowing for greater uniformity and, hence, greater precision in controlling the thermal resistance between the coil and the core. Additionally, the insulator may be formed from a broader range of materials with greater mechanical wear resistance during handling and assembly. The insulator may also be patterned to have structural features, such as ridges and/or indentations, to guide the winding of the coil wire, to protect the electrical insulation of the wire from sharp edges and/or corners of the stator core assembly, and/or to increase the structural stiffness for handling.

An inventive stator assembly may include a bus bar with different types of connectors to terminate the leads of a wire to the bus bar using a lower-energy, lower-temperature process than soldering or welding. In one example, the bus bar may include a fastener connector configured to receive the wire and a fastener, such as a set screw, that plastically deforms the wire to ensure the wire maintains contact with the bus bar. In another example, the bus bar may include a crimp connector that allows the wire to be crimped directly to the bus bar. The insulator and the bus bar connectors described herein are readily adaptable to various stator core assembly designs.

Figure 3A:
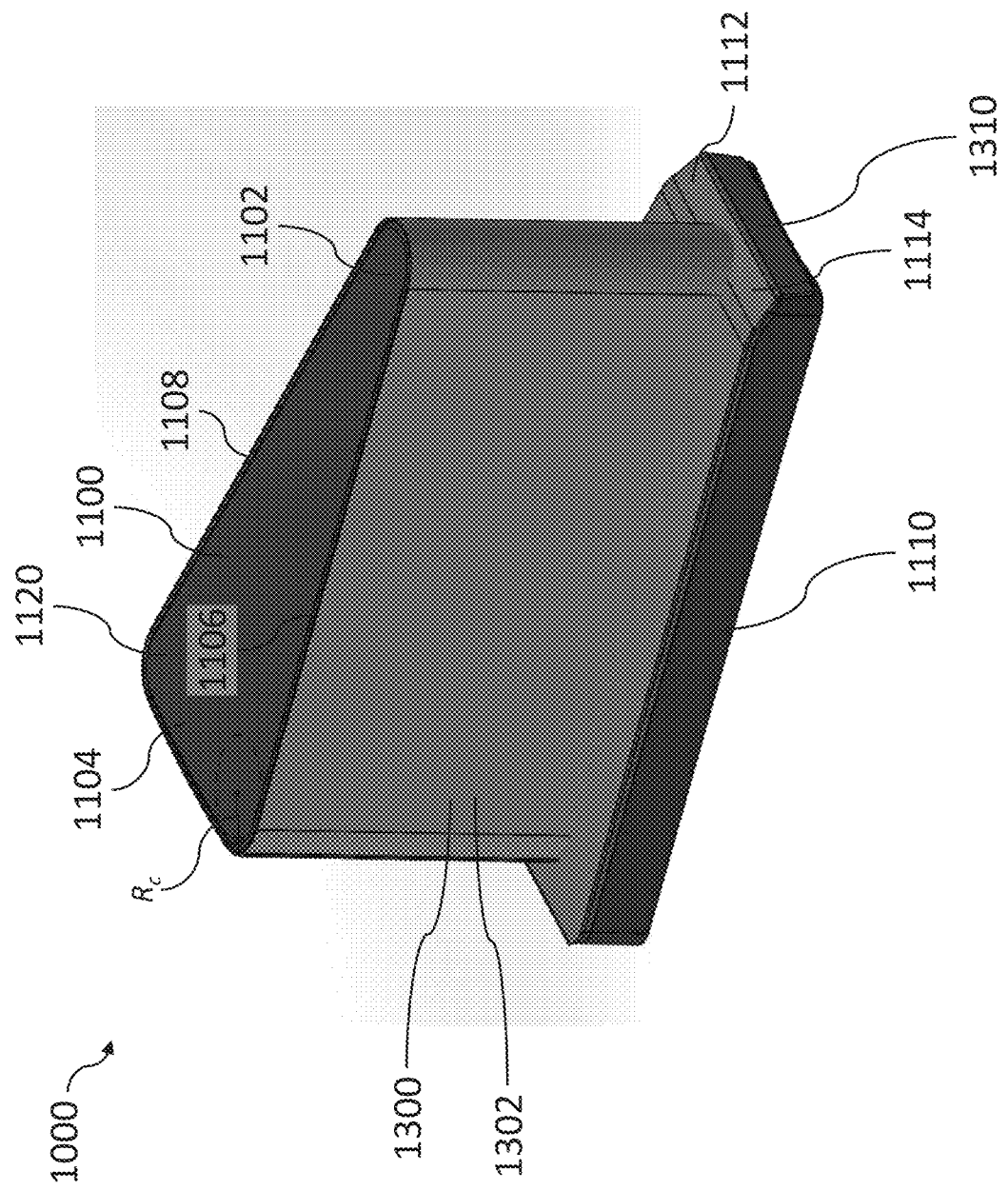
FIG. 3A shows a perspective view of an exemplary stator core assembly.
Figure 3B:
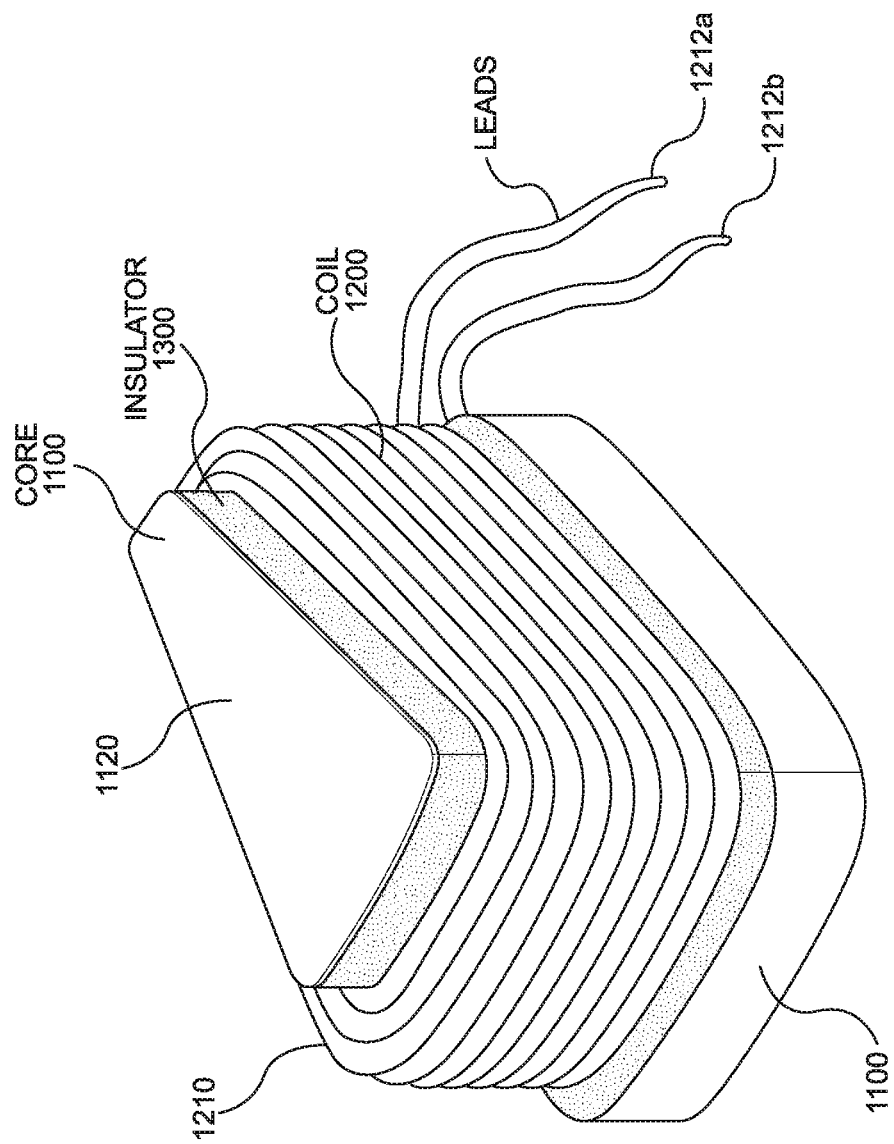
FIG. 3B shows another perspective view of the stator core assembly of FIG. 3A where a coil is shown wrapped around a core and an insulator.

FIGS. 3A and 3B show one exemplary stator core assembly 1000 utilizing an insulator 1300. FIG. 3A shows the insulator 1300 wrapped about the stator core assembly 1000. FIG. 3B shows a coil 1200 formed by winding a wire 1210 around the core 1100 and the insulator 1300. In general, a stator assembly may include multiple stator core assemblies 1000 with arrangements based, in part, on the type of motor being built. For example, the motor may be a radial flux motor, which includes a rotor disk that defines a rotation axis and a stator assembly with multiple stator core assemblies 1000 that generate magnetic fields oriented along a radial axis orthogonal to the rotation axis. The magnetic fields generated in a radial flux motor interact primarily with the side of the rotor disk. In another example, the motor may be an axial flux motor, which includes a rotor that defines a rotation axis and a stator assembly with multiple stator core assemblies 1000 arranged in a similar manner as the stator assembly 100a that generate magnetic fields oriented parallel to the rotation axis. In this case, the magnetic fields interact primarily with the face of the rotor disk.

The shape and dimensions of each stator core assembly 1000 and the number of stator core assemblies 1000 in the stator assembly may depend on various factors including desired power density, desired orientation and/or spatial distribution of the magnetic fields generated by the coils 1200, size constraints imposed on the motor, desired wire gauge for the coil 1200, desired electrical conductance of the coil 1200, and desired electrical current input to the coil 1200. For example, the stator assembly may have multiple, substantially identical stator core assemblies 1000 uniformly distributed about a desired axis (e.g., the radial axis of a radial flux motor or the rotation axis of an axial flux motor).

The stator core assemblies 1000 may be coupled to a support structure (e.g., a disk or annular plate) and arranged such that each stator core assembly 1000 is placed proximate to or abuts another stator core assembly 1000, thus increasing the density of the stator core assemblies 1000 in the stator assembly and, hence, the power density of the motor. The core 1100 of each stator core assembly 1000 may be a separate component mounted to the support structure or may be formed with the support structure as a single component. The insulator 1300 and/or coil 1200 may then be mounted to each respective core 1100.

The core 1100 may have various shapes that depend, in part, on the desired shape of the respective coil 1200 and/or the desired amplification of the magnetic field produced by the coil 1200. For example, the core 1100 in an axial flux motor may have a wedge shape that subtends a portion of a circle. FIG. 3A shows the core 1100 may have a core section 1120 that includes a nose 1102 disposed closer to the rotation axis of the stator assembly and a tail 1104 disposed further away from the rotation axis. The nose 1102 may be joined to the tail 1104 by sides 1106 and 1108.

The edges of the core 1100 may be rounded (e.g., in the shape of a fillet, which is a concave strip of material roughly triangular in cross section that rounds off an interior angle between two surfaces) to reduce or, in some instances, prevent the wire 1210 from getting nicked or damaged. The corners of the core 1100 formed by the nose 1102 and the sides 1106 and 1108 and/or the tail 1104 and the sides 1106 and 1108 may also be rounded with a radius of curvature ($R_c$) sufficient to reduce undesirable stress and/or strain along the wire 1210 that may otherwise damage the electrical insulation of the wire 1210 as the wire 1210 is wound around the core 1100. Generally, the wire 1210 may have a diameter ($D_w$) and the radius of curvature Re may be greater than or equal to 10 $D_w$.

FIG. 3A shows the core 1100 may further include a flange section 1110 (also referred to herein as a "flange 1110") to support the core section 1120 and facilitate assembly to a support structure. As shown, the flange section 1110 may provide a platform to support the wire 1210 of the coil 1200 wrapped around the core section 1120. The flange section 1110 may also include a lead-in portion 1112, which has a sloped surface located near the nose 1102 of the core section 1120. The flange section 1110 may also include lead-out portion 1114, which also includes a sloped surface joined to the lead-in portion 1112 and disposed near the nose 1102. The sloped surfaces of the lead-in portion 1112 and the lead-out portion 1114 may be formed as a chamfered or rounded edge to provide a smooth lead in and lead out for the wire leads 1212a and 1212b (collectively referred to herein as a "wire lead 1212" or "lead 1212"), which electrically couple the stator core assembly 1000 to a bus bar (e.g., the bus bar 1400 in FIG. 9A).

The relative magnetic permeability of the core 1100 may also vary depending on the desired operating conditions and/or applications of the motor. For example, cores with a relative magnetic permeability less than 10 (i.e., coreless stators) may be preferable in applications where high switching frequencies and/or low mass is desired. In another example, cores with a relative magnetic permeability greater than 1000 (i.e., cored stators) may be preferable in applications where a higher power density is desirable. The core 1100 may be formed from various materials, including iron and electrical steel. The core 1100 may also include electrically insulating material to reduce or mitigate power losses due to circulating eddy currents generated within the bulk material of the core 1100. The electrically insulating material may be formed from various materials, including inorganic material (e.g., polyimide, polyamide), organic material (e.g., fish paper), or combinations of inorganic and organic materials (e.g., fiber-reinforced silicone).

The core 1100 may also be formed using various manufacturing methods. For example, the core 1100 may be formed using powder metallurgy where powder is pressed and sintered to produce a monolithic core and/or individual/subsets of multiple core segments. Once sintered, the core 1100 may be post-processed, which may include post-machining to bring the sintered parts to their desired dimensions and/or to add mounting or alignment features. The powder may also include an electrically insulating coating to impede undesirable eddy currents from reducing motor efficiency as described above.

In another example, the core 1100 may be a laminated core produced from one or more strips of material (e.g., electrical steel) that are spiral wound or concentrically nested. An indexed punching operation may remove a portion of the strip such that the resulting laminated support structure resembles an annular disc with an array of axially protruding wedge-shaped features that each function as a core 1100. An electrical insulating material may be applied to the surface of the original strip material and/or inserted between adjacent layers in the laminated core to improve motor efficiency by impeding undesirable eddy currents. The laminated core may also be post-processed via post-machining steps to add mounting and/or alignment features.

The coil 1200 may be formed from the wire 1210, which is wound into a shape that conforms to the core 1100. The dimensions of the coil 1200 may vary depending on the manner in which the coil 1200 is formed from the wire 1210. For example, the wire 1210 may be wound directly onto the core 1100 (an insulator 1300 may be placed between the core 1100 and coil 1200 prior to winding). In this approach, the coil 1200 may be in substantial physical contact with the core 1100 to increase heat dissipation from the core 1100 through the coil 1200 (i.e., reducing thermal resistance between the core 1100 and the coil 1200) and the packing density of the wire.

In another example, the coil 1200 may be wound around a mandrel and transferred from the mandrel onto the core 1100 or the insulator 1300. In this case, the coil 1200 may be loose or flexible enough to ensure that it can be placed around the core 1100. Once in place around the core 1100, the coil 1200 may be tightened to increase physical contact between the core 1100 and the coil 1200 for heat dissipation. The wire 1210 may also be wound in a manner that increases the packing density. For example, the wire 1210 may be wound such that each turn in the winding abuts an adjacent turn (e.g., the coil windings sit on top of one another). The wire 1210 may also be wound into multiple layers around the core 1100. For instance, the wire 1210 in one turn may lie in a crevice formed between two neighboring turns in a preceding layer of the winding (see, for example, FIGS. 5B and 5C).

The wire 1210 may also be tailored to support a desired electric current. For example, the wire 1210 may have a sufficiently large electrical conductivity (e.g., greater than about $3 \times 10^7$ S/m), that a desired electric current may be applied without causing excessive heating of the stator assembly. The gauge of the wire 1210 may range from about 10 to about 20. The wire 1210 may also have various cross-sectional shapes, including circular, square, and rectangular. The wire 1210 may be formed from an electrically conductive material, such as copper or aluminum. The wire 1210 may also include a thin, electrically insulating coating to reduce or, in some instances, prevent unwanted electrical shorting between the wire 1210 and the core 1100 and/or abutting portions of the wire 1210 in the coil 1200 (e.g., adjacent turns in the winding).

However, as described above, the electrically insulating coating on the wire 1210 may be damaged during manufacture (e.g., when winding the wire 1210 into the desired shape of the coil 1200) and/or assembly (e.g., when placing the coil 1200 onto the core 1100). For at least these reasons, the insulator 1300 may be disposed between the core 1100 and the coil 1200 to provide additional electrical insulation and to mechanically protect the electrical insulation of the wire 1210. For example, FIGS. 3A and 3B show the insulator 1300 may be disposed on only portions of the core 1100 where the coil 1200 may physically contact the core 1100, thus excluding coverage of the top surface of the core 1100. Specifically, the insulator 1300 may include a core portion 1302 that covers the core section 1120 of the core 1100 and a flange portion 1310 (also referred to herein as a "flange cover 1310") that covers the flange section 1110 of the core 1100 including, in some instances, the lead-in and lead-out portions 1112 and 1114.

The insulator 1300 may be a conformal, compliant jacket that surrounds, at least in part, the core section 1120. The insulator 1300 may have a shape and/or dimensions dependent on the geometry of the core 1100 and/or the coil 1200. For instance, the thickness of the insulator 1300 may depend, in part, on a balance between providing sufficient electrical insulation to prevent an electrical short between the core 1100 and the coil 1200 and reducing the thermal resistance to reduce the likelihood of the core 1100 overheating.

Insulators for Stator Core Assemblies

Various designs of the insulator 1300 may be incorporated into the stator core assembly 1000. Two exemplary designs of the insulator 1300 (i.e., insulator 1300a and insulator 1300b) are described below. The features described with respect to one design is not limited to that design only, but instead may be incorporated and/or otherwise adapted to other designs of the insulator 1300. Furthermore, references to the insulator 1300 shall also be construed as including all possible designs including insulators 1300a and 1300b.

Figure 4A:
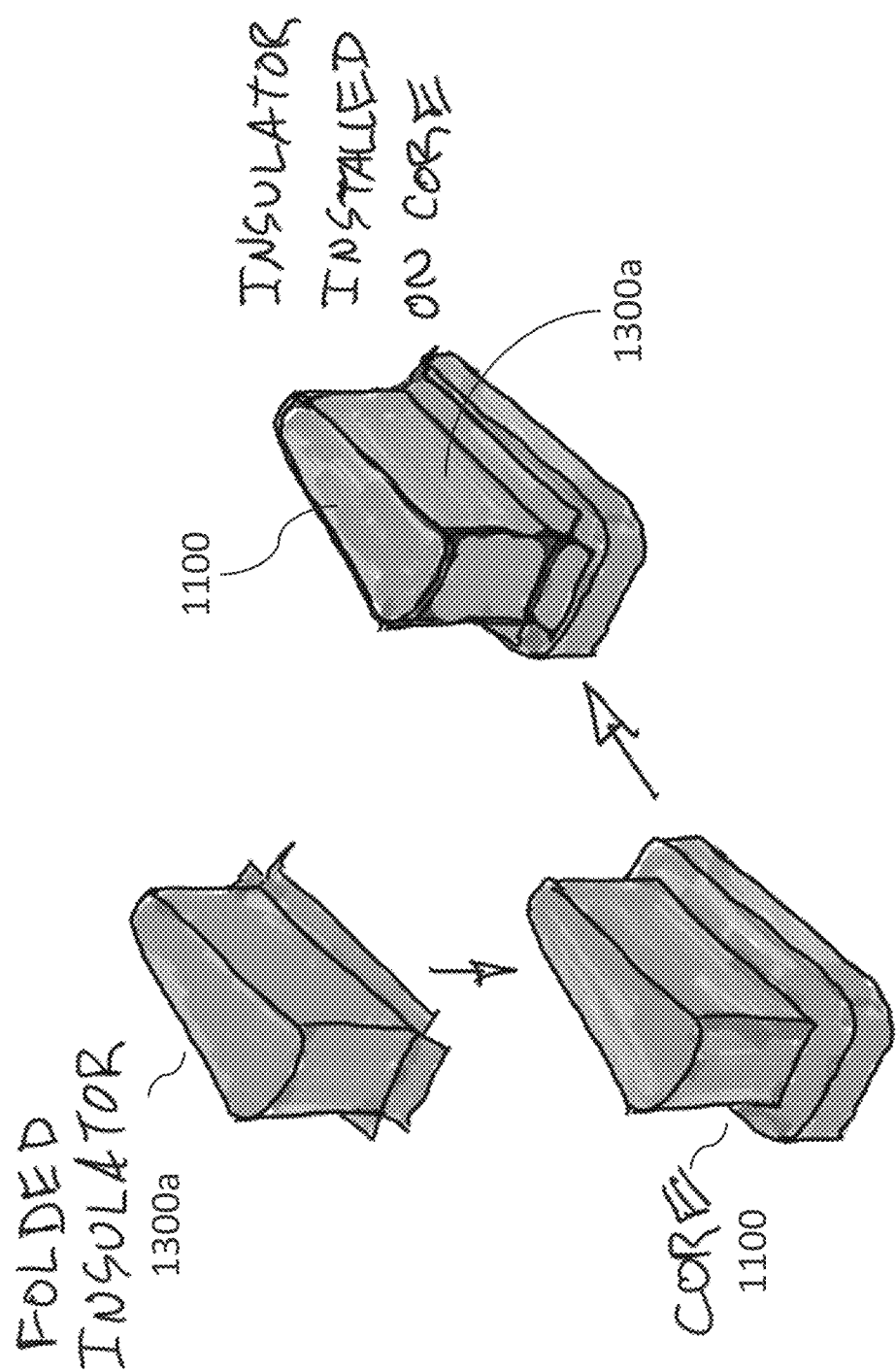
FIG. 4A shows an exemplary insulator folded separately from the core and then transferred onto the core.
Figure 4B:
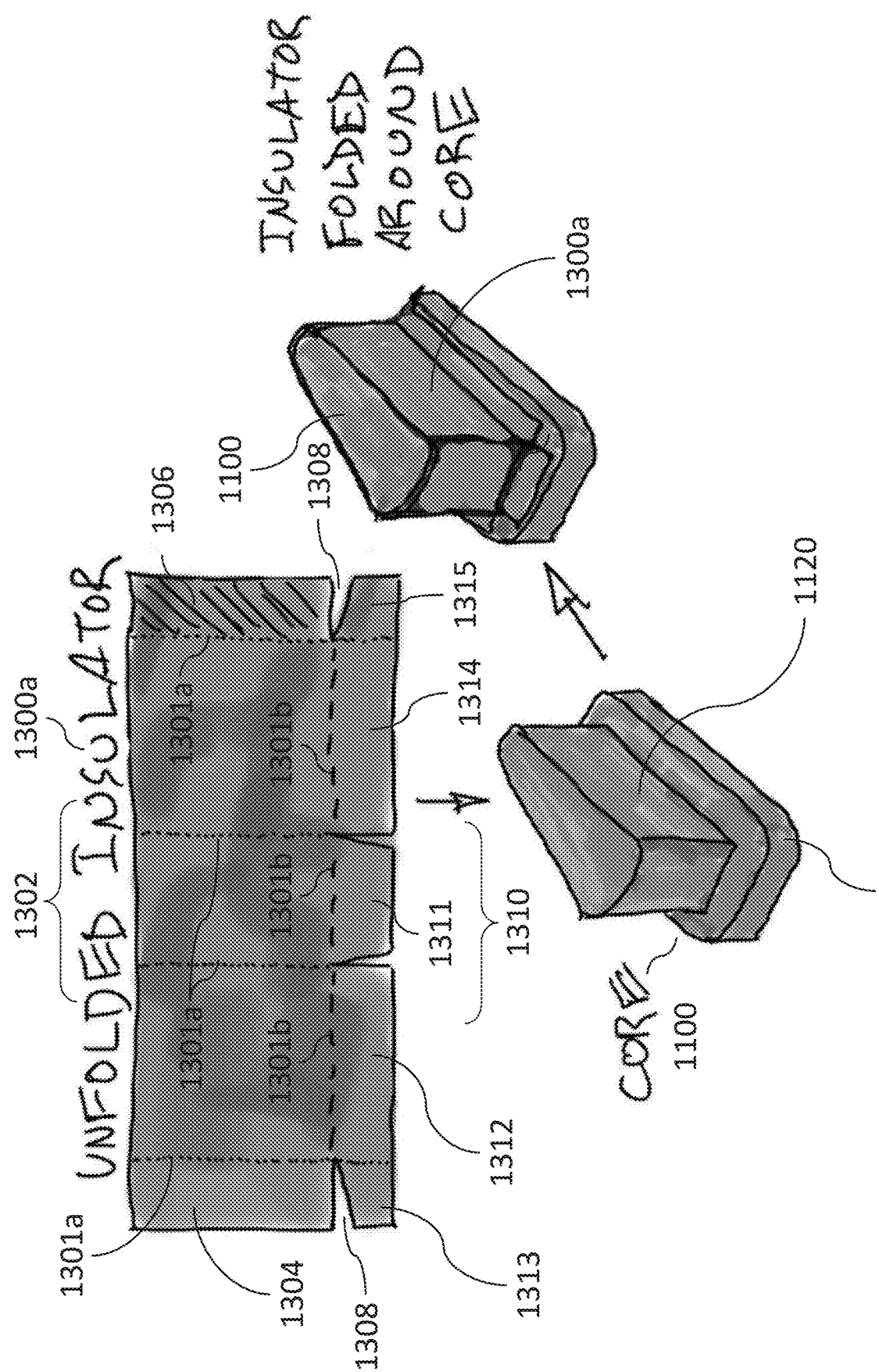
FIG. 4B shows another exemplary insulator folded directly around the core.

FIGS. 4A and 4B show different ways of placing an exemplary insulator 1300a on the core 1100. In both cases, the insulator 1300a may be formed into a three-dimensional structure by folding a two-dimensional sheet or, more generally, a thin, flat material according to a prescribed pattern. In other words, the insulator 1300a may be formed as a single part, such as a single sheet of insulating paper or film. For example, a two-dimensional pattern may be cut into the flat material and subsequently folded into the desired shape of the insulator 1300. FIG. 4B shows one exemplary pattern for the insulator 1300a, when folded, forms a wedge-shaped insulator corresponding to the wedge shape of the core 1100. As shown, the patterned cutout may include a core portion 1302 with several panels separated by fold lines 1301a. The core portion 1302 may further include tabs 1304 and 1306 disposed on opposing ends of the core portion 1302. When the insulator 1300a is folded, the tabs 1304 and 1306 may overlap one another. An adhesive may be applied to one or both of the tabs 1304 and 1306 to attach the tabs 1304 and 1306 together to retain the insulator 1300a in the desired folded shape.

FIG. 4B also shows the patterned cutout may include a cover portion 1310 to cover some or all of the flange section 1110 of the core 1100, the edges of the core 1100 particularly where the wire 1210 is fed in and out of the stator core assembly 1000, and the corners of the core 1100. As shown, the cover portion 1310 may include a rear flange portion 1311 and side flange portions 1312 and 1314 joined to respective panels of the core portion 1302 by reverse fold lines 1301b. The reverse fold lines 1301b indicate the respective panels of the cutout are folded in a direction opposite to the fold lines 1301a. The side flange portions 1312 and 1314 may further include a lead-in tab 1313 and a lead-out tab 1315, respectively, to cover the lead-in and lead-out portions 1112 and 1114 of the flange 1110. The tabs 1313 and 1315 may be tapered in shape to accommodate the wedge shape of the core 1100 resulting in notches 1308 forming between the tabs 1313 and 1304 and the tabs 1315 and 1306.

The rear flange portion 1311 and side flange portions 1312 and 1314 may also increase the mechanical stiffness of the insulator 1300a, which may aid handling especially when placing the insulator 1300a onto a mandrel as discussed below or onto the core 1100 for assembly. Said in another way, the cover portion 1310 may be folded such that the rear flange portion 1311 and side flange portions 1312 and 1314 lie on one or more different planes than the core portion 1302. This, in turn, may make the insulator 1300a and, in particular, the core portion 1302 less prone to deflecting or bowing inwards and/or outwards. A bonding agent or an adhesive may also be applied to the insulator 1300 to reinforce the desired shape of the insulator 1300. For example, a thin epoxy layer may be applied to the insulator 1300a before or after the patterned cutout is folded and subsequently cured, thus increasing the mechanical stiffness of the insulator 1300a. The epoxy layer may also be used to attach the wire 1210 of the coil 1200 to the insulator 1300a.

Figure 5A:
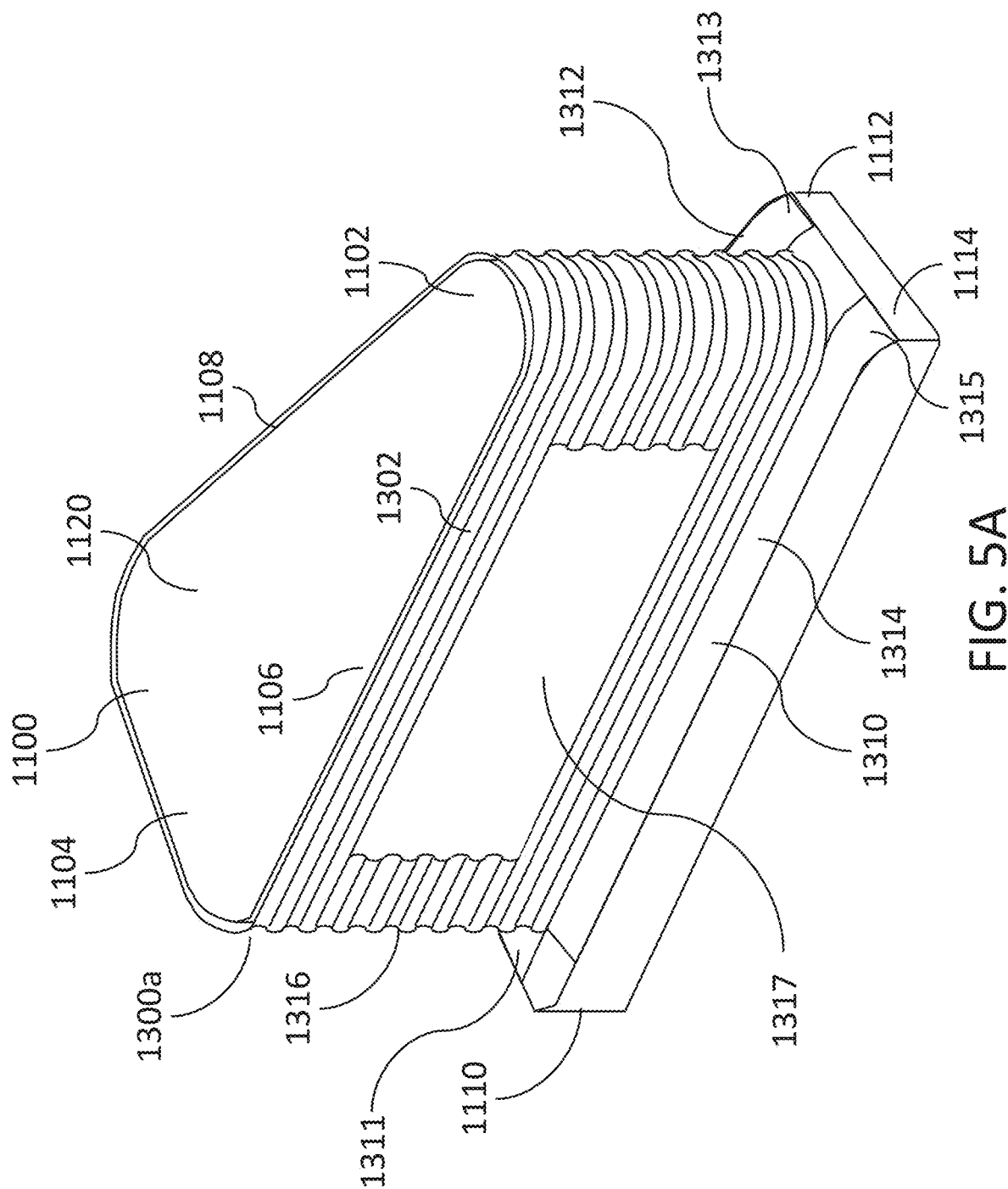
FIG. 5A shows a perspective view of another exemplary insulator with ridges and a window.
Figure 5B:
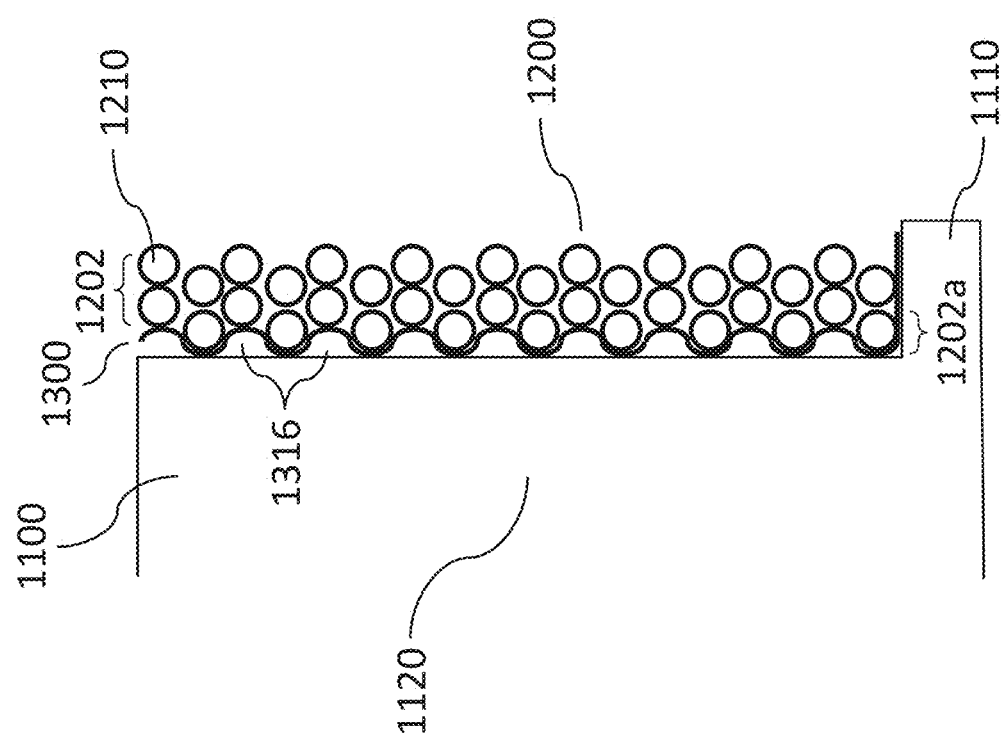
FIG. 5B shows a cross-sectional view of a wire of a coil positioned onto the core based on the ridges of the insulator.

The insulator 1300a may also include various structural features to facilitate assembly of the stator core assembly 1000. For example, FIGS. 5A and 5B show the insulator 1300a may include a series of ridges 1316 to guide the wire 1210 as it is being wound around the insulator 1300a in multiple layers 1202. As described above, a wire 1210 with a round cross-section may naturally lay within a crevice formed by adjacent turns of a preceding layer of the coil 1200. FIG. 5B shows the ridges on the insulator 1300 may be used to guide the wire 1210 when winding the first layer 1202a of each coil 1200 in order to establish a desired pattern and spacing for subsequent layers in the winding. In this manner, the wire 1210 may be precisely positioned on the coil 1200, particularly when transitioning between layers. In some cases, precise layer transitions may appear as distinct jogs between adjacent turns of wire 1210.

The ridges may also be arranged to increase the packing density of the wire 1210 and/or to reduce unwanted abrasive forces applied between neighboring turns in the winding, which may otherwise damage the electrical insulation on the wire 1210. For example, FIG. 5B shows the wire 1210 wound into four layers where the neighboring portions of the wire 1210 in each layer are spaced apart based on the shape and, in particular, the pitch of the ridges 1316. As shown, the pitch of the ridges 1316 may be sufficiently large such that each layer of interest in the coil 1200 does not appreciably contact the layers immediately preceding or following the layer of interest.

Figure 5C:
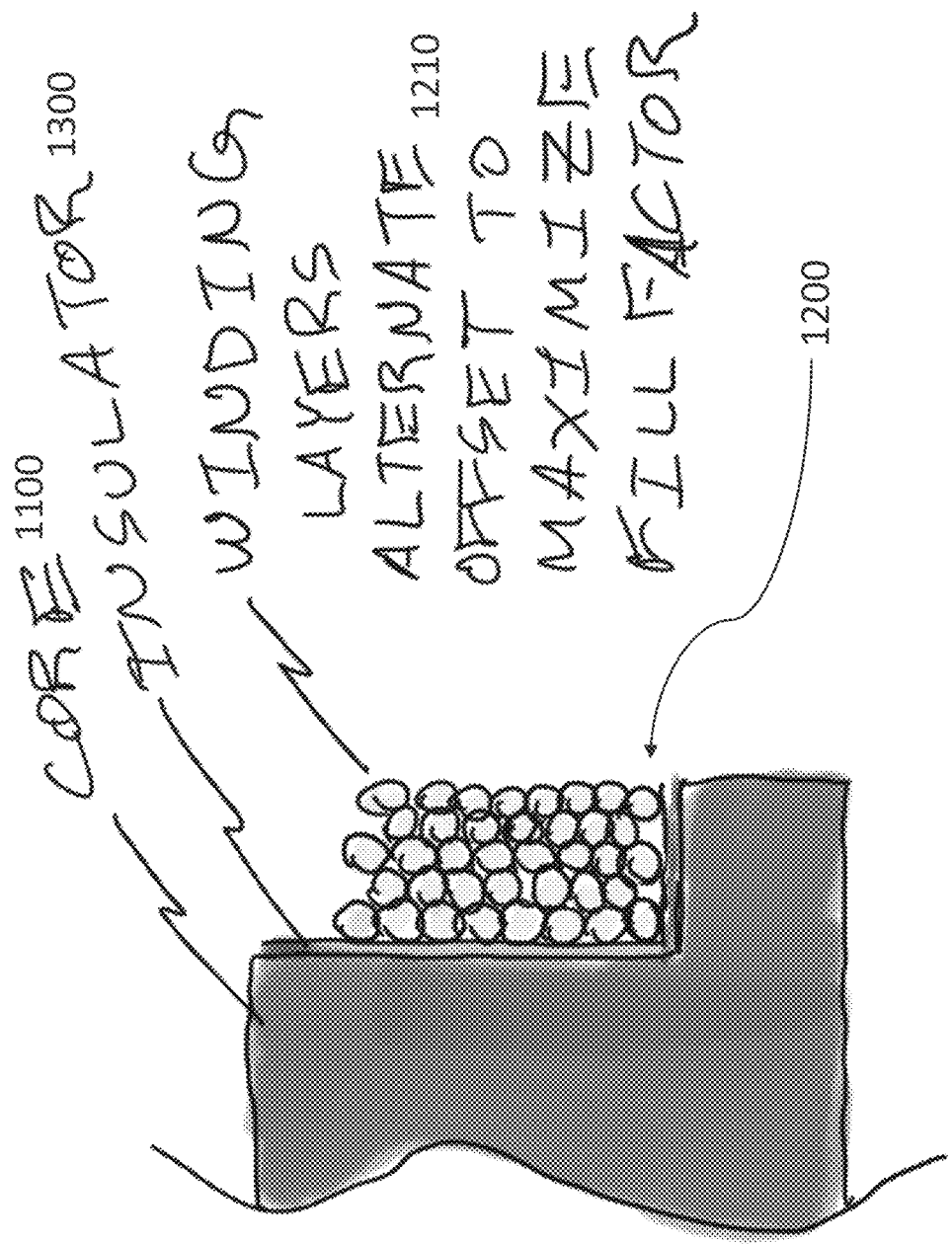
FIG. 5C shows another cross-sectional view of a wire wound into multiple layers around the core.

In another example, FIG. 5C shows the wire 1210 wound into five layers around the insulator 1300. As shown, the neighboring portions of the wire 1210 in each layer may abut one another. In other words, pitch of the ridges 1316 of the insulator 1300a may be smaller compared to FIG. 5B. In some instances, this arrangement of the wire 1210 may be achieved if the insulator 1300a has no ridges. Each layer of interest in the coil 1200 is spatially offset such that the portions of the wire 1210 of the layer of interest lie in the crevices formed between two neighboring portions of the wire 1210 in the layers immediately preceding or following the layer of interest. In this manner, the fill factor or density of the coil windings around the core 1100 is increased.

The insulator 1300a may also be windowed (i.e., it may have one or more openings or apertures) to allow the wire 1210 to directly contact the core 1100 through the windows 1317, thus reducing the thermal resistance between the core 1100 and coil 1200. The wire 1210 may remain electrically insulated from the core 1100 thanks, at least in part, to the insulation on the wire 1210. The openings 1317 may be co-located with flat portions of the core 1100, such as the sides 1106 and 1108, where the coil 1200 is less likely to be damaged (as opposed to the corners of the insulator 1300) when wound around the core 1100 or when wound around the insulator 1300a and subsequently placed onto the core 1100. Said in another way, the insulator 1300a may only be disposed between the core 1100 and the coil 1200 along portions of the core 1100 that are more prone to damaging the wire 1210.

Figure 6A:
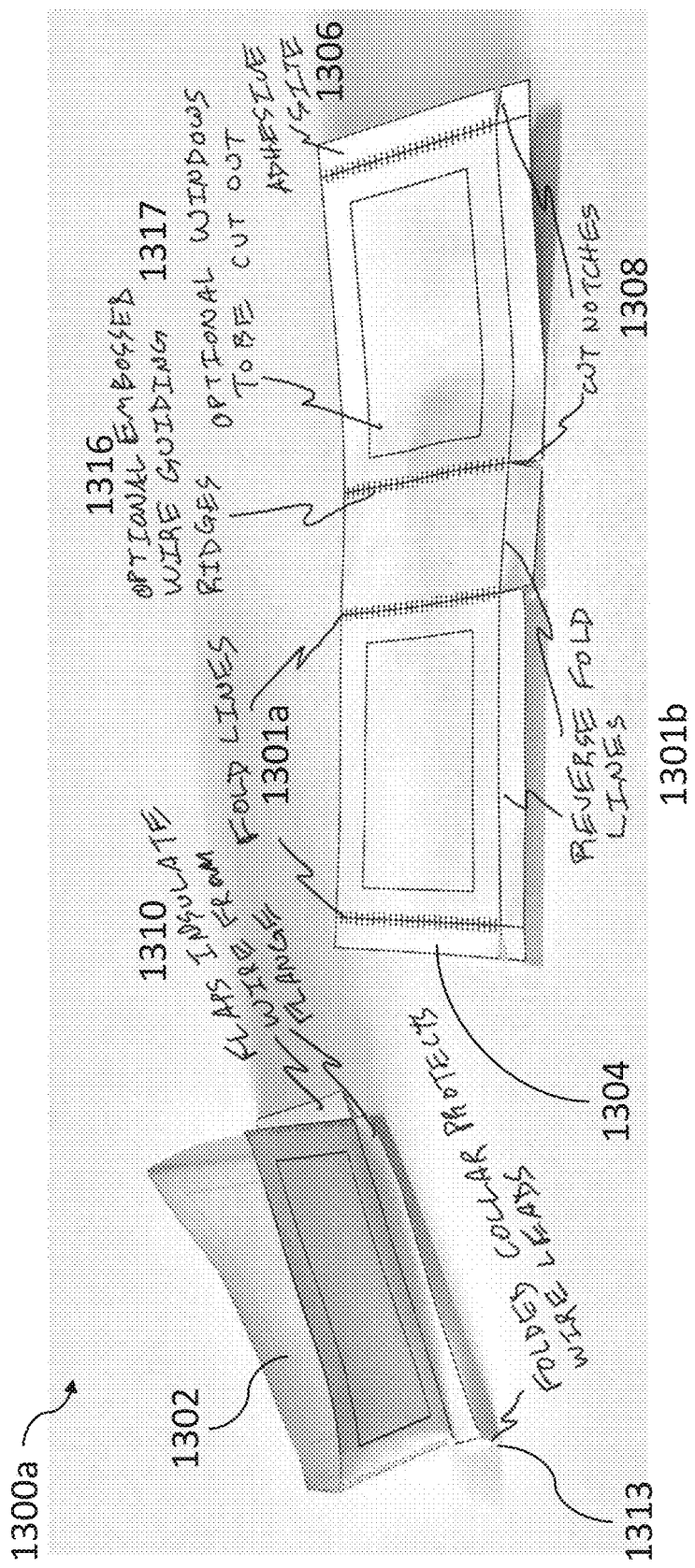
FIG. 6A shows a template or pattern for making the insulator of FIGS. 4A and 4B.
Figure 6B:
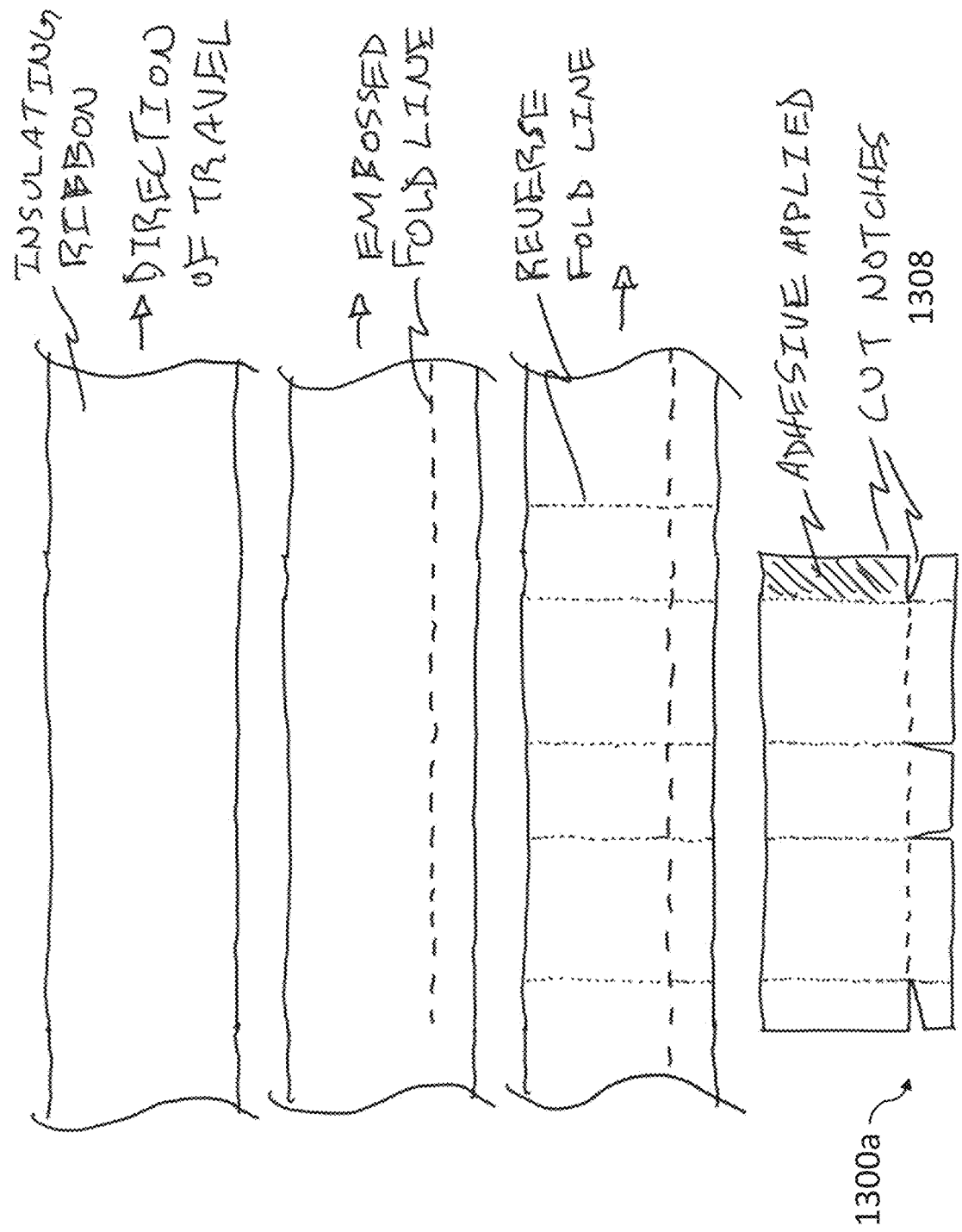
FIG. 6B shows an insulator ribbon used to form an exemplary insulator via a continuous roll-to-roll process.

By forming the insulator 1300 from a flat sheet, simpler, more readily scalable manufacturing processes may be used. For example, FIG. 6A shows a photograph of the patterned cutout similar to FIG. 4B and the resulting insulator 1300a formed by folding the patterned cutout as described above. FIG. 6B shows a series of processes to form the patterned cutout from a sheet of stock material, such as a sheet of insulating paper or dielectric film. Suitable insulating papers and dielectric films include polyimide film, Nomex® insulating paper, Forbon® insulating paper, Mylar® insulating paper, or fish paper, which is a type of fibrous dielectric paper known for its unique combination of strength, ease of forming and punching. These processes may be adapted in a stamping process or a roll-to-roll process.

For a stamping process, the patterned cutout used to form the insulator 1300a may be stamped or cut out of the sheet of stock material, folded into a three-dimensional shape, and then glued together. More specifically, an adhesive may be selectively applied to portions of the cutout (e.g., the tabs 1304 and 1306) used to form the insulator 1300, either before or after the cutout is stamped out of the sheet of stock material. The adhesive may be applied using a mask and an adhesive spray or an adhesive film transfer. The adhesive may also be activated via heat, pressure, or physical contact. Once the adhesive is applied, the patterned cutout on the sheet may be embossed to form the desired structural features into the insulator 1300*a* (e.g., the ridges 1316 to guide the wire 1210 of the coil 1200 during winding, reinforcing sections to protect the electrical insulation of the wire 1210). The patterned cutout may also be sheared to remove the cutout from the sheet and/or to create windows 1317 in the insulator 1300*a*. Once the cutout is removed from the sheet, the cutout may be folded and bent into the desired shape of the insulator 1300*a* and the portions of the cutout with adhesive may be bonded to other respective portions to ensure the insulator 1300*a* retains its shape.

The stamping process may be performed using a single die or multiple dies applied to the sheet in succession. Additionally, the die(s) may be used to produce multiple insulators 1300*a* simultaneously. The multiple insulators 1300*a* may be created in a staggered arrangement such that a larger portion of the sheet stock is used, thus reducing waste and/or reducing the amount of material recycled.

For the roll-to-roll process, the insulator 1300*a* may be formed using a roll of flat insulating material that is continuously fed into a system that forms the insulator 1300*a*. Similar to the stamping process described above, an adhesive may be selectively applied to the sheet as the sheet is carried through the system. The adhesive may once again be activated by heat, pressure, or physical contact. Structural features may be embossed onto the sheet (e.g., alignment features, fold/crease lines) and the sheet may be trimmed and/or chopped to separate the patterned cutout from the sheet. Once removed, the cutout may also be folded and bent into the desired shape and the portions of the cutout with adhesive may be bonded. One or more of these processes may be performed by carousel tools that rotate in a synchronous manner with the moving sheet. Each carousel tool may have multiple, substantially identical features to perform the same desired process on the sheet in succession as the carousel tool rotates. For instance, one carousel tool may include multiple stamping features disposed on the periphery of the carousel to emboss the sheet in rapid succession as the sheet translates and the carousel rotates.

Figure 7A:
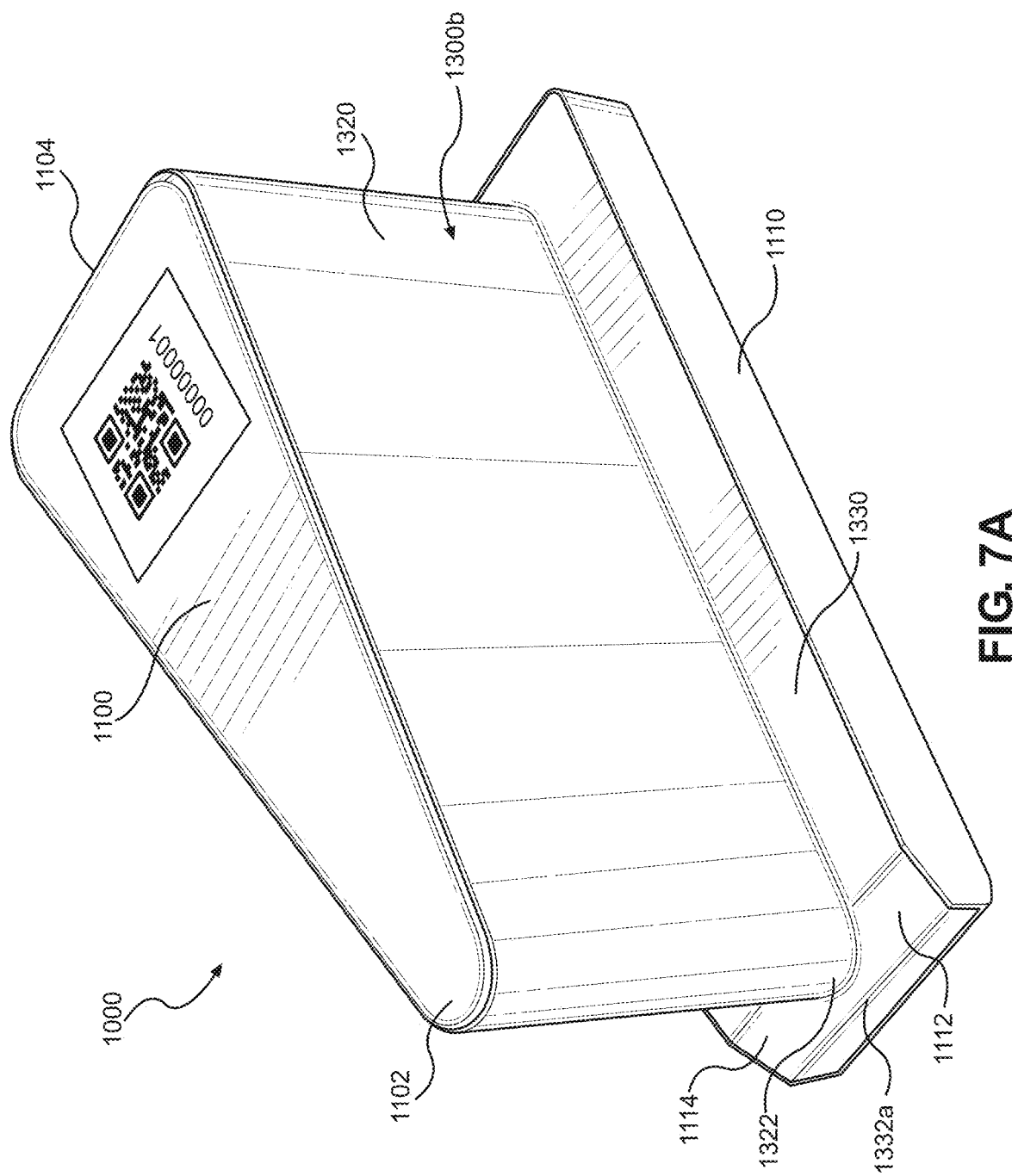
FIG. 7A shows a front perspective view of another exemplary stator core assembly with a polyimide insulator.
Figure 7B:
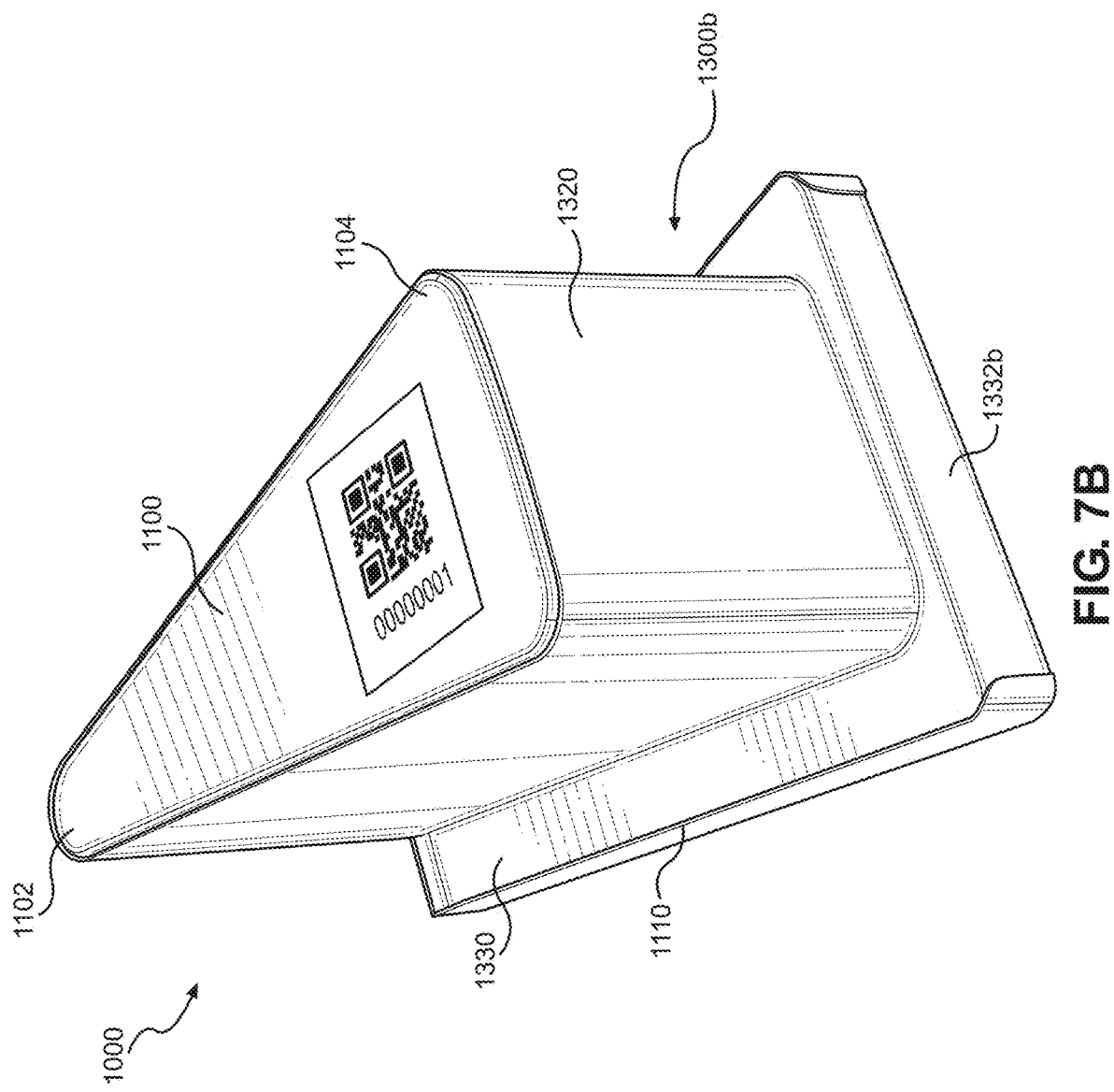
FIG. 7B shows a rear perspective view of the stator core assembly of FIG. 7A.

FIGS. 7A and 7B show another exemplary stator core assembly 1000 with a two-piece insulator 1300*b*. The two-piece insulator 1300*b* may include a side insulator 1320 to insulate the side walls of the core section 1120 of the core 1100 and a flange insulator 1330 to insulate the flange section 1110 of the core 1100. The flange insulator 1330 may provide insulation along the lower edge of the core 1100, which has overhangs 1332*a* and 1332*b* to wrap down and cover the lead-in and lead-out portions 1112 and 1114 near the nose 1102 and the flange section 1110 near the tail 1104, respectively. The insulator 1300*b* is designed to be a close fit with the coil 1200 (e.g., line to line with the vertical edge of the coil 1200) such that when the insulator 1300*b* is seated down into the corners of the core 1100, the inner edge is forced to curve upward around a small fillet at the location where the sides of the core section 1120 meet the flange 1110.

The flange insulator 1330 is installed by sliding the flange insulator 1330 down over the vertical sides of the core 1100 such that the core 1100 passes through an opening 1334 and pressing down against the base surface of the flange 1110. The side insulator 1320 wraps around the side walls of the core 1100 with at least a single layer. The side insulator 1320 also includes an outdent 1322 at a location corresponding to where the nose 1102 of the core 1100 protrudes down to provide insulating coverage between the core 1100 and the coil 1200 (including the leads 1212 of the wire 1210).

Figure 7C:
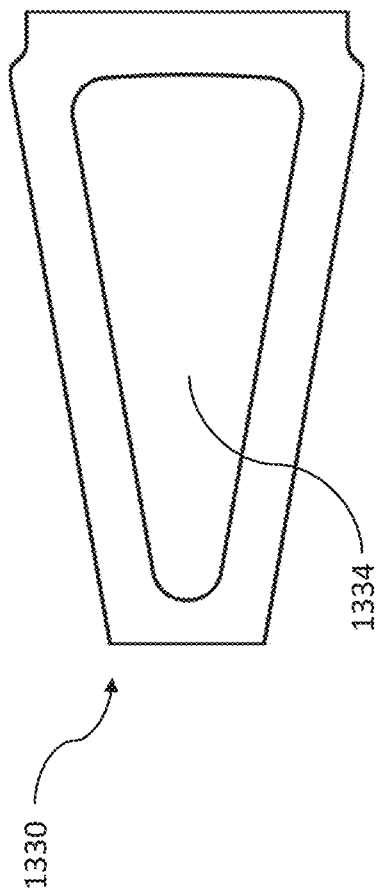
FIG. 7C shows an exemplary template or pattern for making a flange insulator in the stator core assembly of FIG. 7A.
Figure 7D:
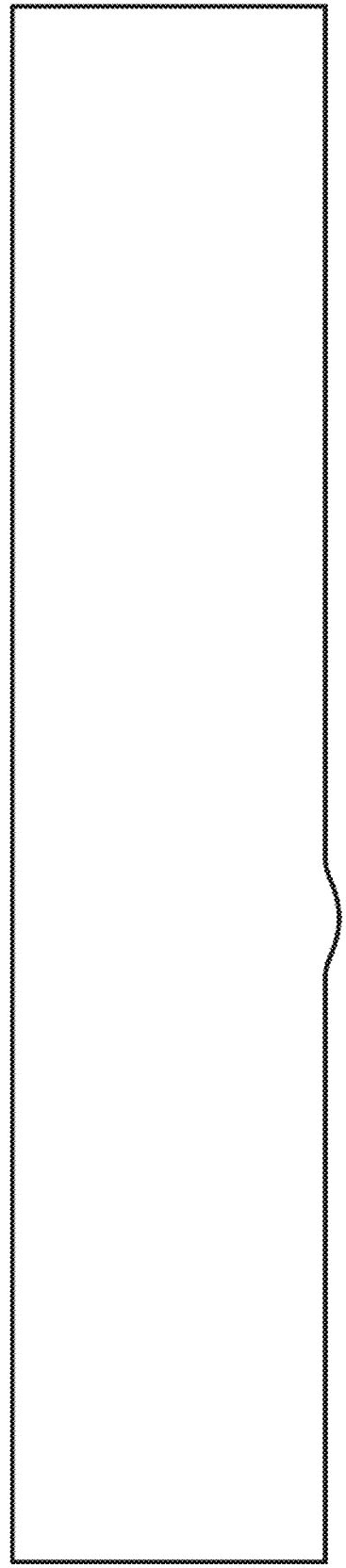
FIG. 7D shows an exemplary template or pattern for making a side insulator in the stator core assembly of FIG. 7A.

The side and flange insulators 1320 and 1330 may be formed of the same or different insulating materials in various shapes such as a thin film. The application and positioning of the side and flange insulators 1320 and 1330 onto the core 1100 may also be aided by the inclusion of an adhesive backing. For example, the side and flange insulators 1320 and 1330 in FIGS. 7A and 7B are formed of adhesive-backed polyimide film. Similar to the folded insulators 1300*a* described earlier, the insulators 1300*b* may be formed using standard film processing techniques (e.g., punched with steel rule dies, laser ablation, or cut with a flying blade) and may then be applied to the stator core assembly 1000 manually or using automated equipment. FIGS. 7C and 7D show exemplary templates or patterns for the side and flange insulators 1320 and 1330, respectively. The side and flange insulators 1320 and 1330 work together to insulate the core 1100 from the coil windings 1200. This approach simplifies, speeds up, and standardizes the application of insulation to the cores 1100.

Once the insulator 1300*a* or 1300*b* (collectively referred to herein the "insulator 1300") is folded into the desired shape, various approaches may then be used to add the insulator 1300 to the stator core assembly 1000. For example, FIG. 4A shows the insulator 1300*a* may be folded separately and placed onto the core 1100. Then, the coil 1200, which may also be formed separately, may be placed onto the core 1100 and around the insulator 1300*a* thereafter. In another example, FIG. 4B shows the insulator 1300*a* may be folded around the core 1100 followed by placement of the coil 1200. The wire 1210 may be wound around a mandrel in the shape of the core 1100 to form the coil 1200 and the coil 1200 may then be removed from the mandrel and placed onto the core 1100 and/or the insulator 1300. The mandrel may be dimensioned to be slightly larger than the core 1100 to ensure the coil 1200 can readily fit onto the core 1100 and the insulator 1300. Once the coil 1200 is placed onto the core 1100/insulator 1300, the coil 1200 may be tightened to ensure sufficient contact between the coil 1200 and the core 1100.

In yet another example, the coil 1200 may be formed by winding the wire 1210 directly onto the insulator 1300 before or after the insulator 1300 is placed onto the core 1100. For instance, the insulator 1300 may be placed directly onto a mandrel (e.g., the insulator 1300 functions as a bobbin) and the wire 1210 of the coil 1200 may be wound around the insulator 1300. The coil 1200 and the insulator 1300 may then be transferred from the mandrel to the core 1100. Alternatively, the core 1100 with the insulator 1300 may be placed onto the mandrel and the wire 1210 of the coil 1200 may be wound around the insulator 1300 and the core 1100. The resultant plastic deformation of the wire 1210 as it is wound to form the coil 1200 may enable the coil 1200 and/or the insulator 1300 to retain the desired shape. As described above, a bonding agent or an adhesive may also be applied to the insulator 1300 to further support and reinforce the desired shape of the coil 1200 and/or the insulator 1300.

Figure 8A:
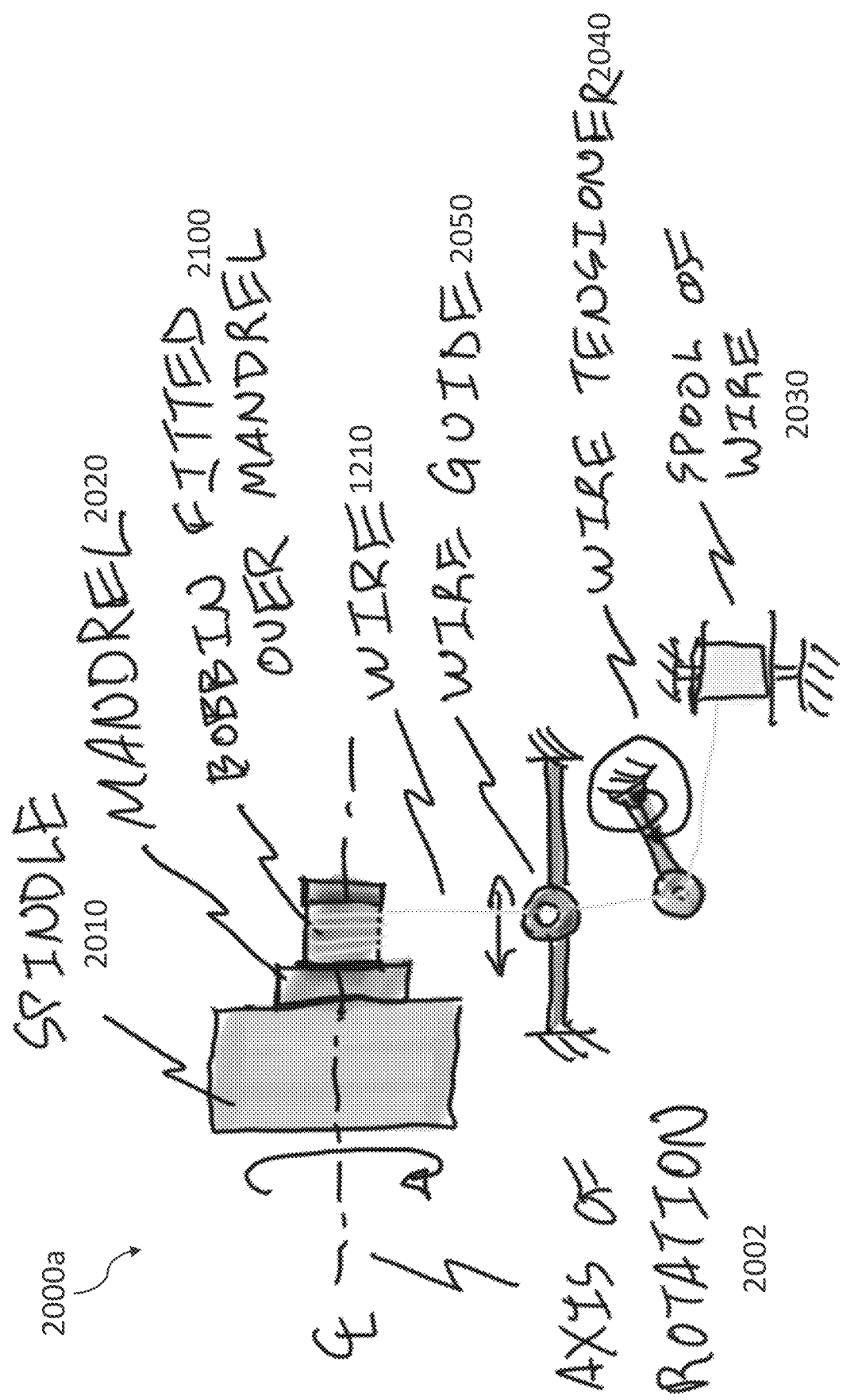
FIG. 8A shows an exemplary coil winding apparatus for winding wire around an insulator that functions as a bobbin.

FIG. 8A shows an exemplary winding apparatus 2000*a* to wind the wire 1210 onto the insulator 1300 to form the coil 1200. As shown, the winding apparatus 2000*a* may include a spindle 2010 that rotates about a rotation axis 2002 and a mandrel 2020 coupled to the spindle 2010. The insulator 1300 may be placed onto the mandrel 2020 to function as a bobbin 2100 to facilitate winding of the wire 1210 used to form the coil 1200. The winding apparatus 2000*a* may include a spool 2030 to supply the wire 1210. The winding apparatus 2000*a* may also include a wire tensioner 2040 to ensure the wire 1210 is under tension as it is wound onto the insulator 1300 and a wire guide 2050 to position the wire 1210 onto the insulator 1300 during winding. The wire tensioner 2040 and the wire guide 2050 together ensure the wire 1210 is wound tightly onto the insulator 1300 to reduce potential slack in the coil 1200 while providing a desired spatial arrangement. For example, the wire guide 2050 may move back and forth to form each layer of the coil 1200. As described above, the insulator 1300 may include ridges 1316 to position the wire 1210 more precisely onto the insulator 1300. Once the coil 1200 is formed around the insulator 1300, the coil 1200 and the insulator 1300 are removed from the mandrel and placed on the core 1100.

Figure 8B:
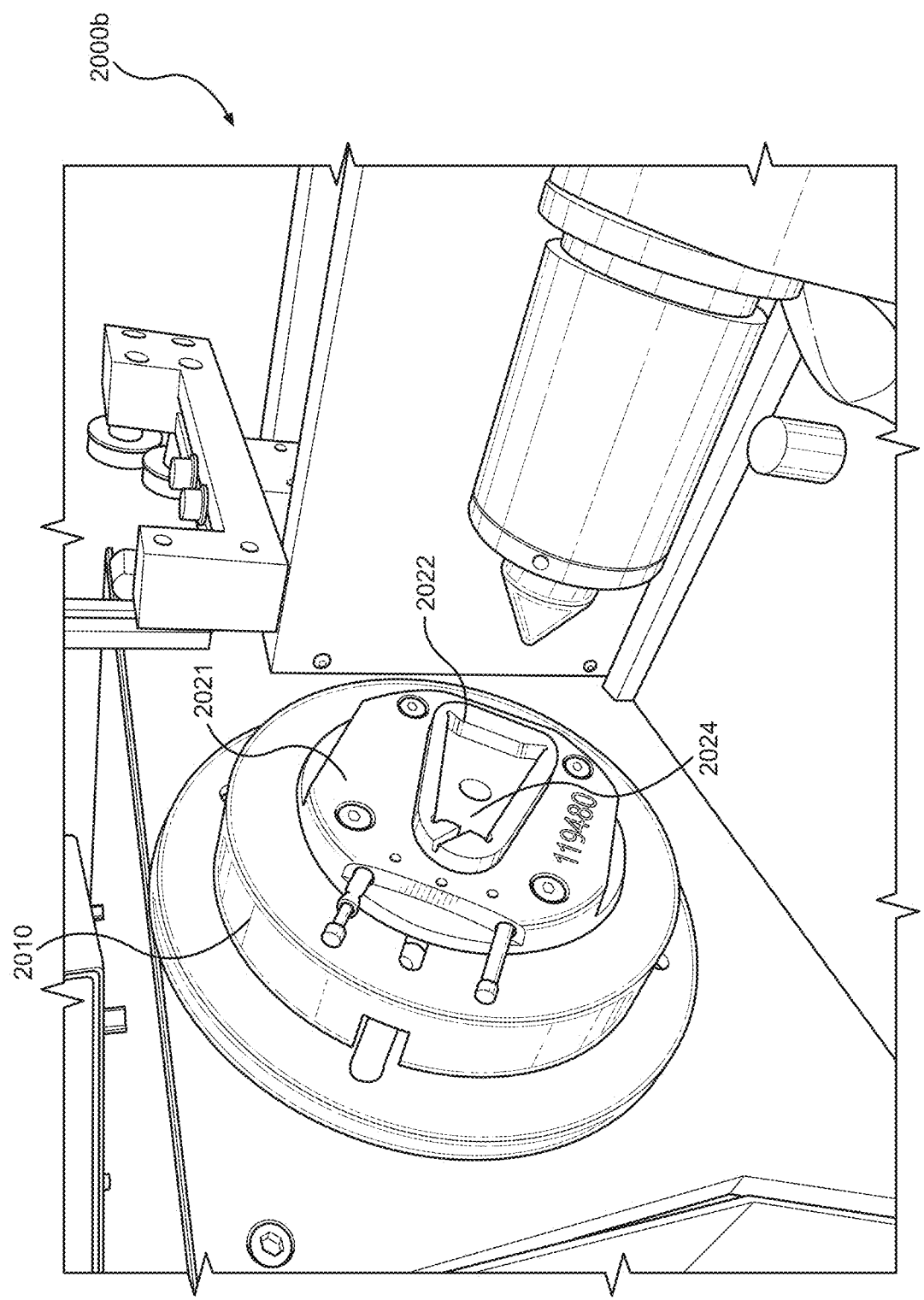
FIG. 8B shows another exemplary coil winding apparatus with a mounting plate coupled to a mandrel to hold a core of a stator core assembly.
Figure 8C:
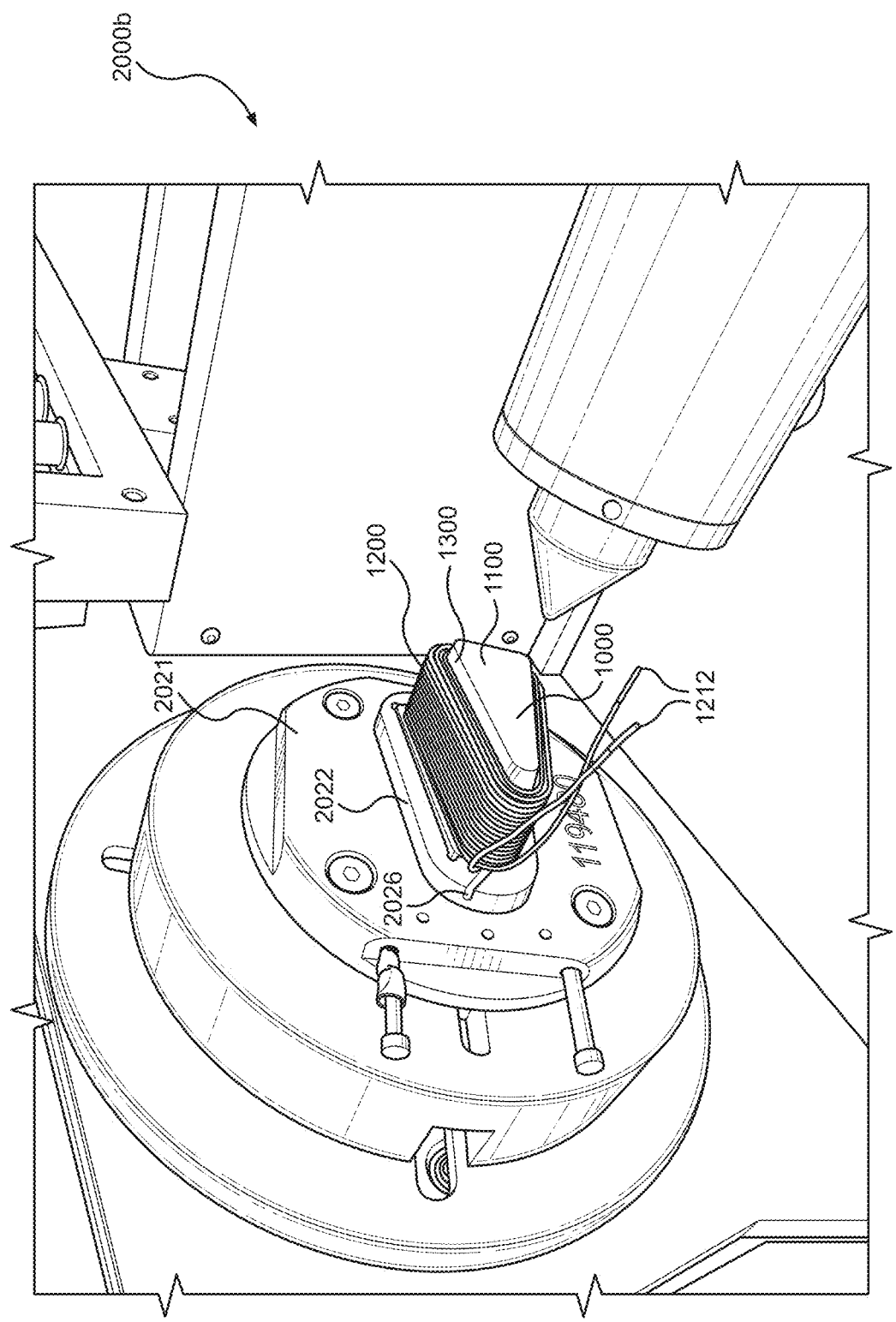
FIG. 8C shows a stator core assembly assembled by winding wire directly onto the insulator and the core using the coil winding apparatus of FIG. 8B.

In another example, FIGS. 8B and 8C show a coil winding apparatus 2000*b* to wind the wire 1210 directly onto the insulator 1300 and the core 1100. The insulator 1300 may be placed onto the core 1100 prior to winding using the various approaches described above. FIG. 8B shows the winding apparatus 2000*b* includes a mounting plate 2021 coupled to a spindle 2010. The mounting plate 2021 is designed to receive and secure the core 1100 with the insulator 1300. Specifically, the mounting plate 2021 includes a protruding ridge 2022 that defines a recess 2024 in the shape of the core 1100. Prior to winding, the core 1100 may be secured to the mounting plate 2021 using various coupling mechanisms including, but not limited to, a press fit, a screw or bolt fastener, and an adhesive. Once the core 1100 is mounted to the mounting plate 2021, one end of the wire 1210 may be mounted to mounting plate 2021 via a notch 2026.

The core 1100 may then be rotated via the spindle 2010 and the mounting plate 2021 and the wire 1210 may be simultaneously fed into the coil winding apparatus 2000*b* such that the wire 1210 is wound around the core 1100 and the insulator 1300. The winding apparatus 2000*b* may also include a spool (not shown), a wire tensioner (not shown), and a wire guide (not shown) similar to the winding apparatus 2000*a*. FIG. 8C shows the stator core assembly 1000 with the wire 1210 wound onto the core 1100 and insulator 1300. Once the coil 1200 is formed, the stator core assembly 1000 may be removed from the mounting plate 2021 and installed into the stator assembly.

By forming the insulator 1300 from a sheet, a broader selection of materials may be used compared to conventional insulators. For instance, conventional insulators were predominantly limited to plastics with mechanical properties to facilitate manufacture via a molding or 3D printing process. Here, the insulator 1300 may be formed from a material that exhibits greater resistance against tearing in order to maintain the desired electrical and thermal properties and to remain between the core 1100 and the coil 1200. For example, the insulator 1300 may be formed from various electrically insulating materials including, but not limited to, plastics (e.g., polyimide), fibrous materials (e.g., fish paper), and rubbers. The insulator 1300 may generally be formed from a sheet having a thickness ranging between about 0.005 inches and about 0.062 inches. The insulator 1300 may be applied to both cored and coreless stators.

Once the coil 1200, insulator 1300, and core 1100 are assembled, additional processing may be applied to each stator core assembly 1000 to improve performance. For example, a potting compound (e.g., a non-flammable, electrically insulating compound) may environmentally seal each stator core assembly 1000 and further reduce the thermal resistance between the core 1100 and coil 1200 by providing additional pathways for heat conduction. In some cases, a mold may be used to pot each individual stator core assembly 1000 prior to assembly into the support structure. Once each stator core assembly 1000 is installed, the free ends of each wire 1210 in the coil 1200 may be terminated to the electric bus (also referred to herein as "phase distribution bus"), e.g., as described below. Once the wire 1210 has been connected to the bus, additional potting compound may be applied to encapsulate the coil 1200 terminations and the electric bus. Alternatively, the stator assembly may be potted as a single unit after the free ends of each wire 1210 of each stator core assembly 1000 is terminated at the corresponding phase distribution bus.

In some cases, this potting process may be preceded by a wire packing process where the coil 1200 is squeezed around the core 1100 to further increase mechanical contact between the wire windings and the core 1100 to further increase heat dissipation. The broad faces of each coil 1200 may be mechanically pressed inwards towards the core 1100, effectively reducing the arc width of the wire 1210 forming the coil 1200. The inclusion of the insulator 1300 in this process may reduce or, in some instances, prevent damage to the electrical insulation of the wire 1210, particularly if the wire 1210 is wound about a corner with a small radius of curvature.

An Exemplary Bus Bar

Once the coil 1200 and the insulator 1300 are coupled to the core 1100 to form the stator core assembly 1000, the wire 1210 may then be terminated at or in a bus bar 1400 to electrically couple the stator core assembly 1000 to a current source. For example, FIG. 3B shows the coil 1200 of the stator core assembly 1000 includes leads 1212*a* and 1212*b* for connection to a bus bar (not shown). Generally, the bus bar may include one or more terminals where each terminal is electrically isolated from each other terminal. For example, the stator assembly may be configured to operate as a single-phase stator where the wires 1210 of each stator core assembly 1000 are connected to the same terminal. In another example, the stator assembly may be configured to operate as a three-phase stator where wires 1210 from the stator core assemblies 1000 are connected to three separate terminals. For instance, a stator assembly with a radial distribution of stator core assemblies 1000 may be arranged such that any set of three neighboring stator core assemblies 1000 within the distribution are connected to the three separate terminals.

As described above, the wire 1210 of each coil 1200 is typically terminated via a soldering or welding process where a filler metal is added to join the lead 1212 of the wire 1210 to the bus bar in a molten state. However, soldering is an energy-intensive process that exposes the wire 1210 to high temperatures, which may damage the electrical insulation of the wire 1210. Additionally, soldering processes often use consumable chemicals (e.g., flux) that improve the quality of the solder joint by cleaning the surfaces being soldered, reducing unwanted oxidation of the material being soldered, and/or increasing the wettability of the solder to the surfaces. Welding processes (e.g., resistive welding, laser welding, ultrasonic welding) similarly entail heating the bus bar and the wire of the coil to high temperatures for attachment. The energy used in soldering and welding processes is typically not recovered and lost as waste heat. In addition, this waste heat can damage other parts of the assembly, including previously soldered wires. Thus, it is desirable to terminate the wire 1210 of the coil 1200 to the bus bar 1400 via a process that uses less energy and is less prone to damaging the wire/electrical insulation of the wire 1210.

Figure 9A:
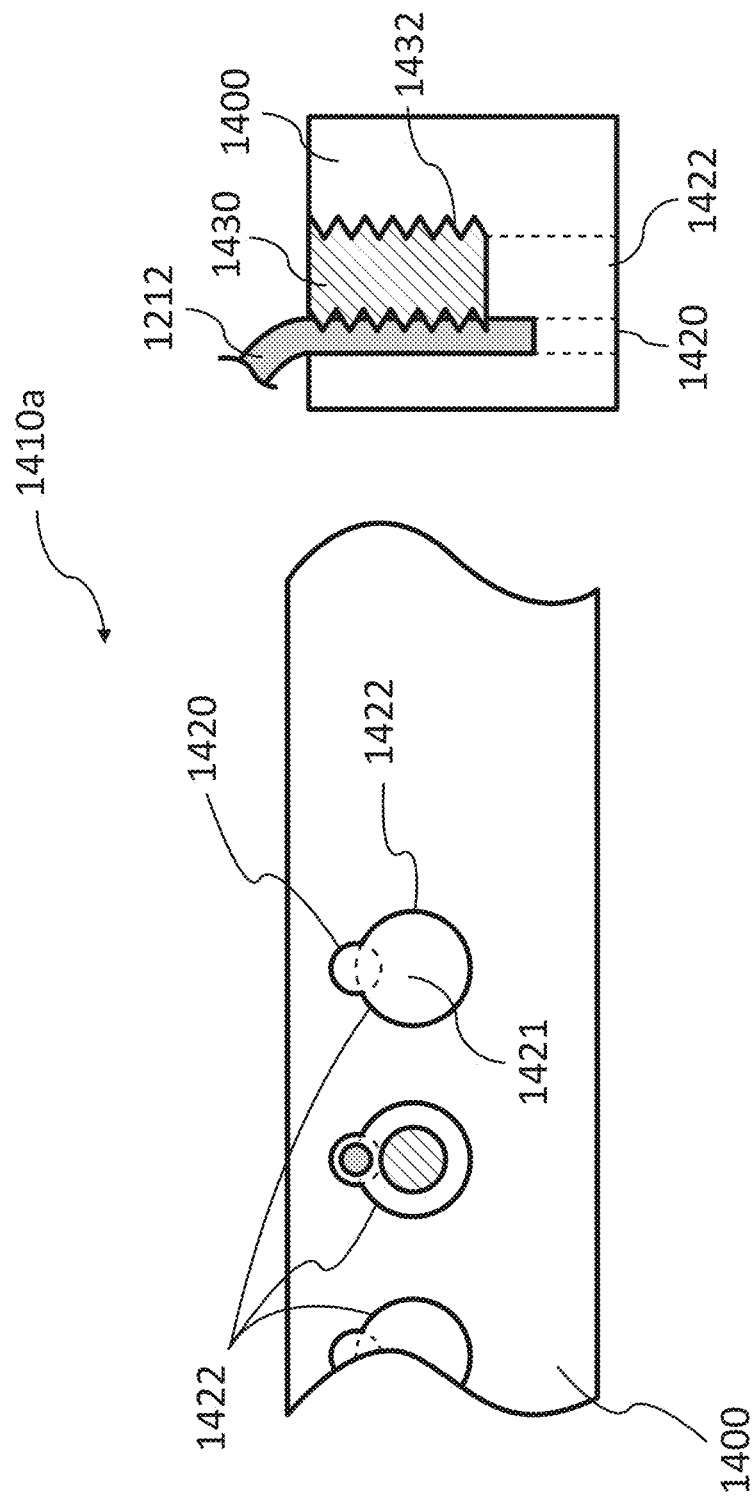
FIG. 9A shows top (left) and side (right) views of a wire attached to a bus bar using a set screw.

FIG. 9A shows one exemplary approach to terminate a wire 1210 to a bus bar 1400 using a fastener connector 1410a. As shown, the bus bar 1400 includes a fastener connector 1410a comprising a wire opening 1420 and a fastener opening 1422 that intersects the wire opening 1420. The wire opening 1420 and the fastener opening 1422 may be viewed as forming one single opening 1421 (also referred to herein as a "bus bar opening 1421") where the perimeter of the opening 1421 is formed by a pair of overlapping or intersecting circles or other shapes. The first circle corresponds to the wire opening 1420 to receive the wire and the second circle corresponds to the fastener opening 1422 to receive a fastener. The fastener opening 1422 and the wire opening 1420 are arranged such that a fastener 1430, when inserted into the fastener opening 1422, mechanically interferes with the lead 1212 of the wire 1210 upon assembly. In FIG. 9A, the fastener 1430 is depicted as a set screw. However, the fastener 1430 may generally be other types of fasteners including, but not limited to, a set screw, a cap screw, a flathead screw, a bolt, and a rivet.

As shown in FIG. 9A, the lead 1212 may be inserted into the wire opening 1420 first and the fastener 1430 may be inserted into the fastener opening 1422 second. When the fastener 1430 is screwed into the fastener opening 1422, the threads 1432 of the fastener 1430 may plastically deform the lead 1212 to ensure the wire 1210 is mechanically and electrically coupled to the bus bar 1400. The fastener 1430 generally does not have to form part of the electrical connection between the wire 1210 and the bus bar 1400. However, an electrically conducting fastener (e.g., a brass screw) may be preferable in some cases to reduce the electrical resistance between the wire 1210 and the bus bar 1400. For example, the lead 1212 of the wire 1210 may be covered with insulation and the threads 1432 of the fastener 1430 may pierce the electrical insulation of the wire 1210 so that the fastener 1430 electrically couples to the lead 1212. The fastener opening 1422 may be threaded to facilitate assembly of the fastener 1430 to the bus bar 1400. The fastener opening 1422 may also be unthreaded in cases where the fastener 1430 is harder than the bus bar 1400 such that the fastener 1430 deforms the fastener opening 1422 during assembly.

Unlike soldering and welding, the fastener approach of FIG. 9A may be applied without prior preparation of the wires 1210 (e.g., removal of electrical insulation, cleaning of surfaces) or the use of chemicals. Fastening in the fastener 1430 also consumes less energy than soldering or welding, which requires elevated temperatures to melt a filler metal. The fastener approach may generally be performed manually by an individual or multiple individuals, partially automated, or fully automated.

Figure 9B:
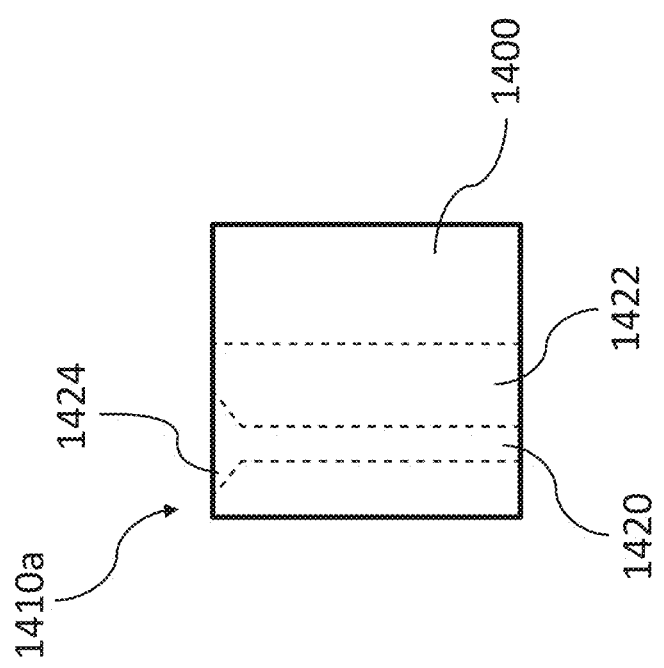
FIG. 9B shows a side view of another bus bar with a countersink.

FIG. 9B shows the wire opening 1420 may also include a countersink 1424 to assist with alignment and insertion of the lead 1212 into the wire opening 1420. The bus bar 1400 may include multiple sets of wire openings 1420 and fastener openings 1422 to terminate the multiple wires 1210 from the multiple stator core assemblies 1000 in the stator assembly and to provide redundant termination points in the event a wire 1210 should be reattached to the bus bar 1400 or a stator core assembly 1000 is replaced.

The fastener 1430 may be formed of a material sufficiently harder than the wire 1210 such that the threads of the fastener 1430 plastically deform the wire 1210 as the fastener 1430 is screwed into the opening 1422. As described above, the fastener 1430 may also be formed of an electrically conductive material to reduce the electrical resistance between the wire 1210 and the bus bar 1400. For example, the fastener 1430 may be formed from materials including, but not limited to, brass, copper, or aluminum. The bus bar 1400 with the wire openings 1420 and fastener openings 1422 may be formed using various fabrication processes including, but not limited to, casting, drilling, tapping, and stamping. The wire openings 1420 and fastener openings 1422 may also have a diameter up to about 2 mm. In some designs, the wire openings 1420 and fastener openings 1422 may also be dimensioned to have a gap between the wire 1210 and the wire opening 1420 and/or the fastener 1430 and the fastener opening 1422.

Figure 10B:
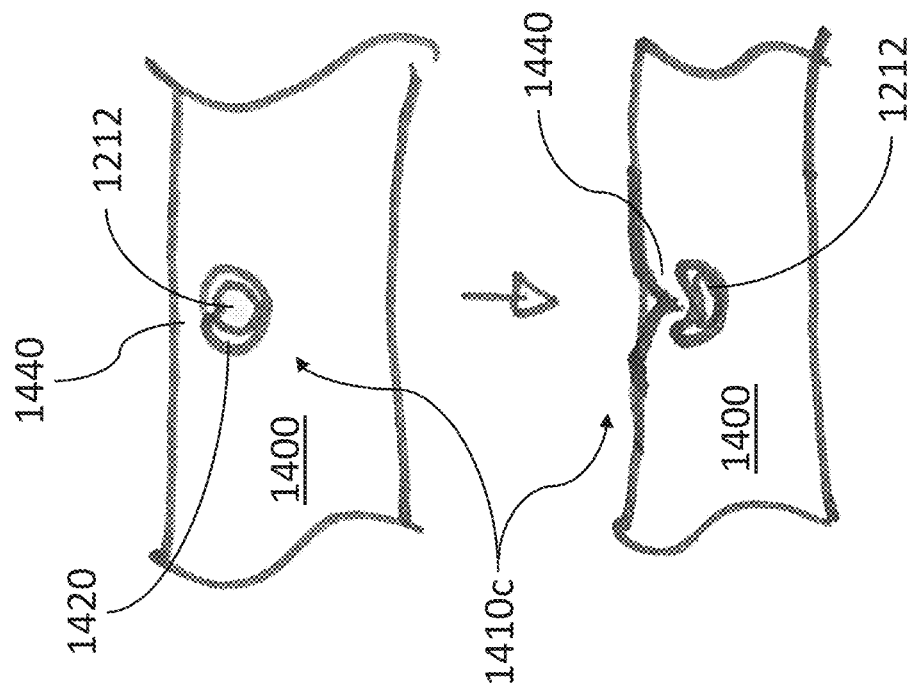
FIG. 10B shows another crimp connector with a thin, deformable section formed in a bus bar.
Figure 10A:
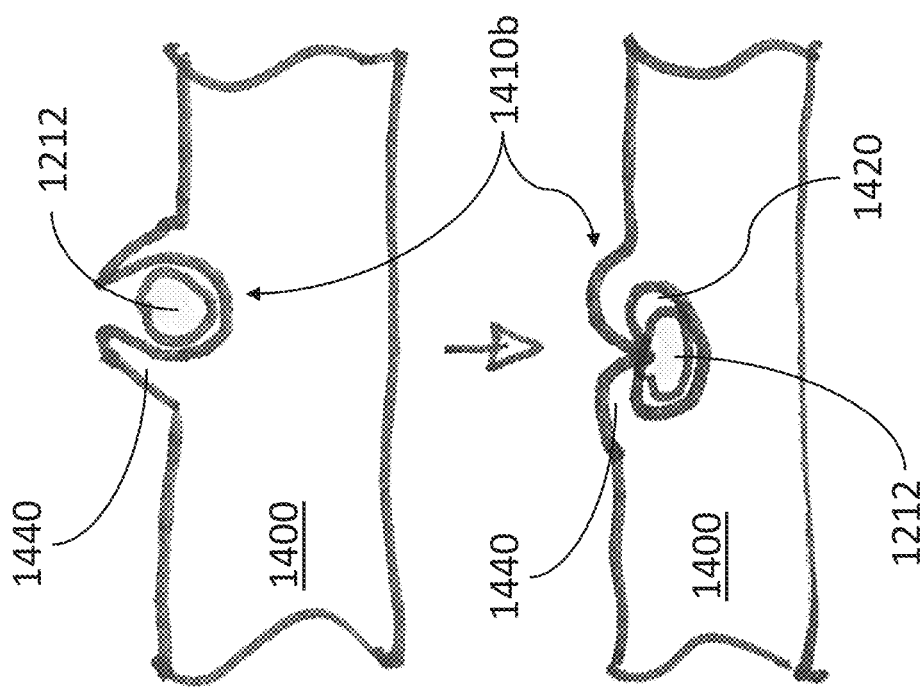
FIG. 10A shows a wire being attached to a bus bar using a crimp connector with a two-horned structure disposed on the surface of the bus bar.

FIGS. 10A and 10B show another exemplary approach to terminate the wire 1210 to the bus bar 1400 using a crimp connector 1410b or 1410c, respectively. As shown, the crimp connectors 1410b and 1410c may each include a wire opening 1420 and a deformable portion 1440 of the bus bar 1400 adjoining the wire opening 1420. During assembly, a wire 1210 may be inserted into the wire opening 1420. The deformable portion 1440 and the lead 1212 may then be subjected to a pressure greater than the yield strength of both components, thus causing the deformable portion 1440 and the lead 1212 to plastically deform and touch one another. In this manner, the wire 1210 is mechanically and electrically coupled to the bus bar 1400. In some instances, a cold weld may be formed between the bus bar 1400 and the wire 1210 if the bus bar 1400 and the wire 1210 are formed from materials with a substantially similar composition and preferably, substantially similar material properties.

The dimensions of the wire opening 1420 may vary based on the size of the wire 1210 being terminated. The deformable portion 1440 may include one or more sections configured to mechanically deform upon application of an external force. For example, FIG. 10A shows the crimp connector 1410b has a "devil-horn" structure in which two horned structures (e.g., thicker at the base, thinner at the free end) are designed to curl inwards into the wire opening to couple the lead 1212 to the bus bar 1400. In another example, FIG. 10B shows the crimp connector 1410c includes a thin-walled section of the bus bar 1400 adjoining and partially defining the wire opening 1420. The shape and dimensions of the deformable portion 1440 may depend, in part, on the force used for crimping and the mechanical properties of the bus bar 1400. In FIG. 10A, the crimp connector 1410b is depicted as being formed onto the surface of the bus bar 1400. However, the crimp connector 1410b may also be formed within the bulk of the bus bar 1400, as shown in FIG. 10B. The location of the crimp connector 1410c within the bus bar 1400 may depend, in part, on the stiffness of the material and the dimensions of the deformable portion 1440 proximate to the wire opening 1420.

In order to prevent or mitigate mechanical failure (e.g., fracture) of the crimp connectors 1410b and 1410c and/or bus bar 1400, strain relief features may also be integrated into the crimp connectors 1410b and 1410c. The strain relief features may include fillets and/or chamfers at the top and/or bottom of the wire opening 1420 to reduce stress concentrations in the bus bar 1400 near or in the crimp connectors 1410b and 1410c. The bus bar 1400 may include multiple crimp connectors 1410b and 1410c to receive the multiple wires 1210 from the multiple stator core assemblies 1000 in the stator assembly and to provide redundant crimp connectors sin the event a wire 1210 should be reattached to the bus bar 1400 or a stator core assembly 1000 is replaced.

Similar to the fastener approach, the crimp connectors 1410b and 1410c may be used without prior preparation of the wires 1210 or the use of chemicals. Additionally, the crimp connectors 1410b and 1410c may be integrated directly into the bus bar 1400 to simplify manufacture. The bus bar 1400 with the crimp connectors 1410b and 1410c may be formed using various fabrication processes including, but not limited to, casting and machining. The wire opening 1420 may also have a diameter up to about 2 mm.

Figure 11:
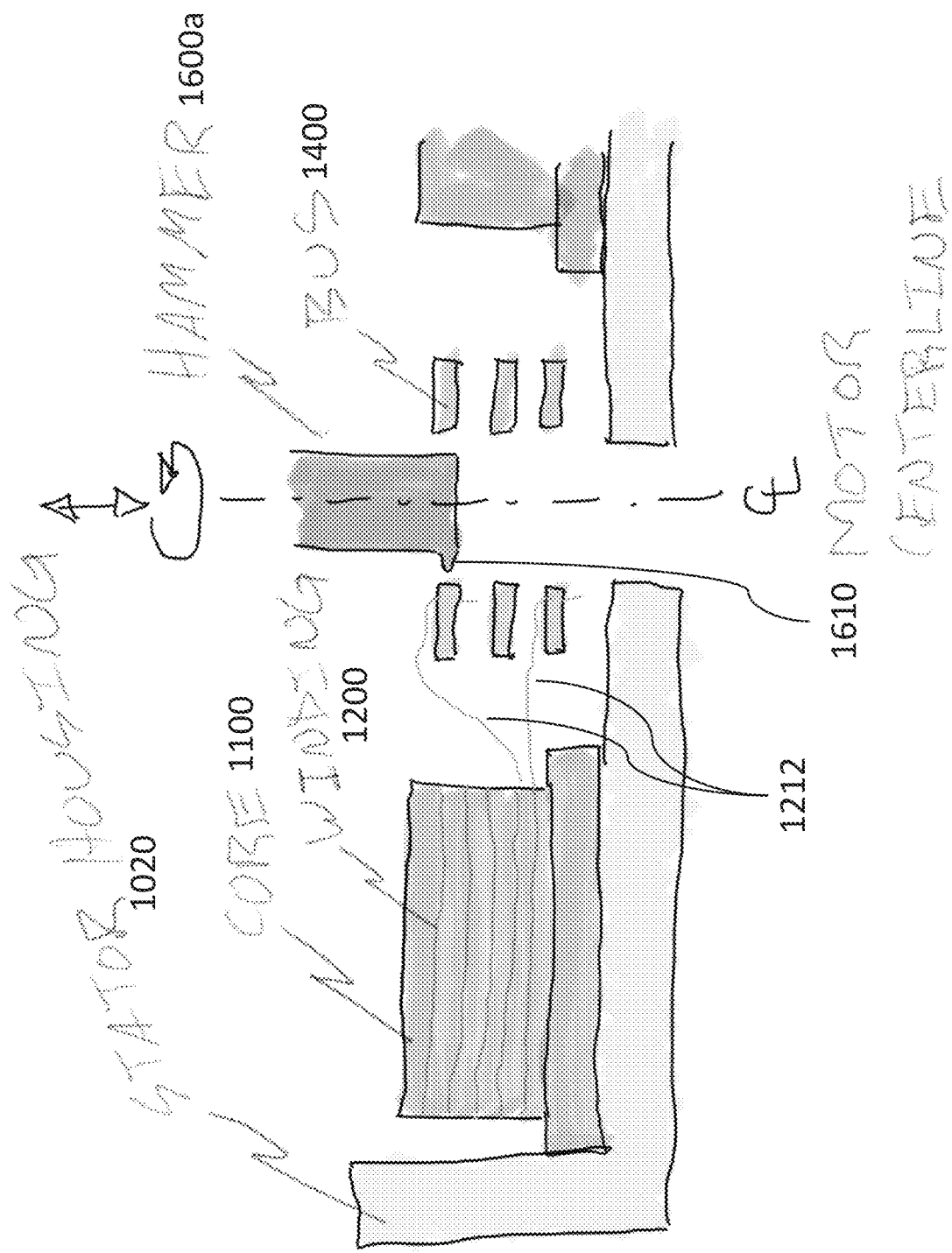
FIG. 11 shows a side view of an exemplary apparatus to crimp wires onto bus bars using a rotating hammer.

FIG. 11 shows an exemplary apparatus to crimp multiple wires 1210 in the stator assembly to one or more bus bars 1400. As shown, the apparatus may include a hammer 1600a that rotates about a motor centerline axis 1010 defined by the geometry of the stator assembly. The hammer 1600a includes a tip 1610 that physically contacts a region of each bus bar 1400. The contact region may be similar in size or larger than the portion of the bus bar surface occupied by the crimp connectors 1410b or 1410c. As shown, multiple bus bars 1400 may be mounted to the stator assembly. The bus bars 1400 may be arranged in groups located along the motor centerline axis 1010. Prior to crimping, the wires 1210 from each respective stator core assembly 1000 may be inserted into the wire openings 1420 of corresponding crimp connectors 1410b. The electrical insulation at the end of each wire 1210 may be removed prior to insertion.

Once the wires are inserted into the crimp connectors, the hammer 1600a may be moved axially along the motor centerline axis 1010 to a first location coinciding with a first group of bus bars 1400. The hammer 1600a may then be actuated to move the tip 1610 of the hammer 1600a into contact with the bus bar 1400. The hammer 1600a may then be rotated until the tip 1610 contacts a crimp connector on the bus bar 1400. Once contact is made between the hammer tip 1610 and the crimp connector, the hammer 1600a may then apply pressure to the crimp connector such that the wire is crimped to the bus bar 1400. The hammer tip 1610 may then be retracted, and the hammer 1600a may then be rotated relative to the bus bar 1400 (and the stator assembly) by an indexed displacement until another crimp connector is aligned to the hammer tip 1610. This process may be repeated until the desired crimp connectors of the first group of bus bars 1400 are crimped. The hammer 1600a may then be moved to subsequent locations along the motor centerline axis 1010 to crimp the remaining wires to the respective bus bars 1400.

Figure 12A:
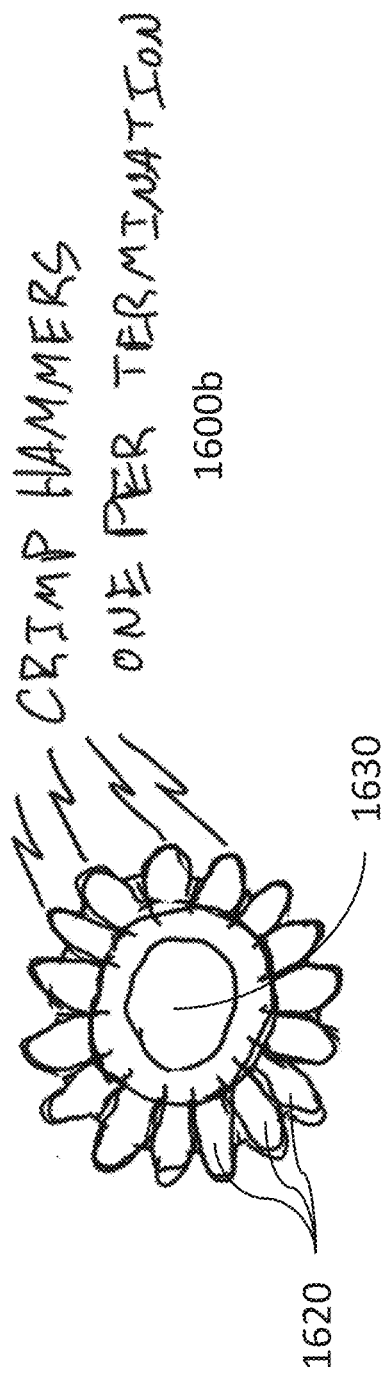
FIG. 12A shows a top view of another exemplary apparatus to crimp wires onto bus bars using a radially expanding hammer.
Figure 12B:
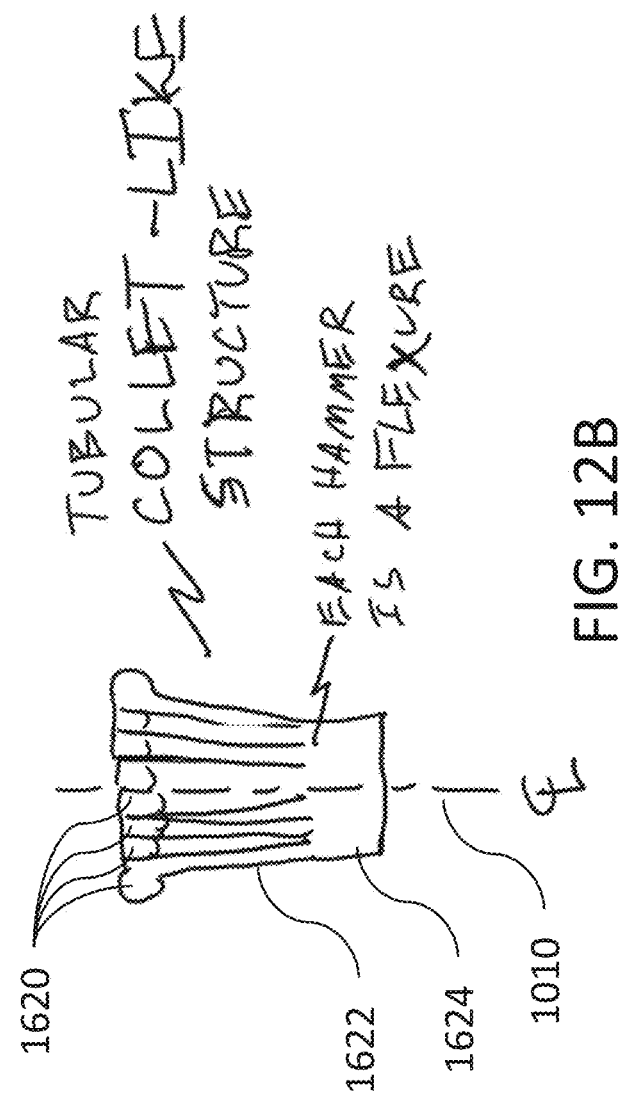
FIG. 12B shows a side view of the radially expanding hammer of FIG. 12A.
Figure 12C:
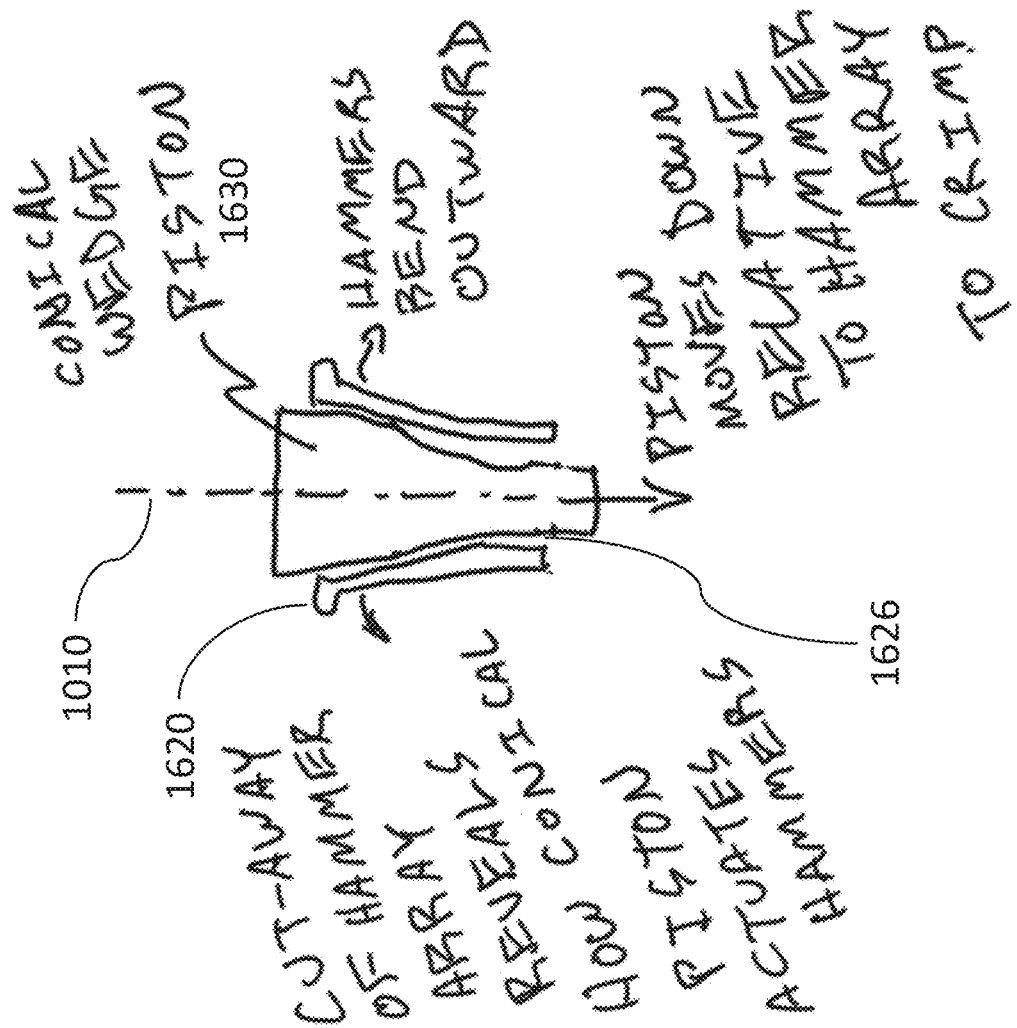
FIG. 12C shows a cross-sectional view of the radially expanding hammer of FIG. 12A.

FIGS. 12A-12C show another exemplary apparatus with a hammer 1600b that includes multiple tips 1620 that expand and contract radially to crimp multiple wires 1210 to the bus bar 1400 simultaneously. Specifically, each tip 1620 is connected to a base 1624 via an arm 1622. Each arm 1622 may be shaped and/or dimensioned to flex and/or bend. The tips 1620 may further surround and define a through hole 1626 in which a piston 1630 is disposed. As shown in FIG. 12C, the piston 1630 may have a conical shape such that as the wider portion of the piston 1630 is pushed through the through hole 1626, the resultant contact between the piston 1630 and the arms 1622 causes the arms 1622 to deflect outwards. The arms 1622 may bend in an elastic manner such that when the piston 1630 is retracted (i.e., the wider portion is removed from the through hole 1626), the arms 1622 return to its original unbent shape.

During assembly, the wires 1210 from each respective stator core assembly 1000 may be inserted into the wire openings 1420 of corresponding crimp connectors 1410b or 1410c prior to crimping. The hammer 1600b may then be inserted into the center of the stator assembly (e.g., along the motor centerline axis 1010). Once the hammer 1600b is positioned at a desired location relative to the stator assembly, the piston 1630 may be displaced such that the tips 1620 radially expand outwards to contact the multiple crimp connectors. Once contact is made, the tips 1620 may continue to expand radially in order to exert a pressure sufficient to crimp multiple wires 1210 to the bus bar 1400. After the wires 1210 are crimped to the bus bar 1400, the piston 1630 may be retracted, thus returning the tips 1620 to their original position. This process may be repeated for subsequent groups of bus bars located along the motor centerline axis 1010 similar to the hammer 1600a.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions, and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A stator core assembly for a stator assembly of an electric motor, the stator core assembly comprising:
   a core comprising:
      a core section; and
      a flange section joined to the core section;
   a coil formed by a wire wrapped around the core section; and
   an insulator disposed on the core section and at least a portion of the flange section such that the insulator is between the core and the coil, the insulator comprising:
      a core portion disposed on the core section, the core portion having a plurality of ridges to position the wire of the coil onto the core and one or more openings co-located with one or more flat portions of the core section such that the wire of the coil directly contacts the core section through the one or more openings of the insulator; and
      a flange portion, disposed on at least a portion of the flange section, to reduce physical contact between the wire and the flange section of the core.

2. A stator assembly, comprising:
   the stator core assembly of claim 1 wherein the wire of the coil has a lead; and
   a bus bar electrically coupled to the lead of the wire.

3. The stator assembly of claim 2, wherein the lead of the wire is attached to the bus bar without a filler metal.

4. The stator assembly of claim 2, wherein the lead of the wire is physically attached to the bus bar via a cold weld.

5. The stator assembly of claim 2, wherein the bus bar defines a bus bar opening to receive the lead of the wire and to receive a fastener having threads that physically contact and plastically deform the lead of the wire thereby electrically coupling the wire to the bus bar.

6. The stator assembly of claim 5, wherein
   the lead of the wire is covered by insulation; and
   the threads of the fastener pierce the insulation to electrically couple the fastener to the lead of the wire.

7. The stator assembly of claim 2, wherein the bus bar comprises:
   a wire opening to receive the lead of the wire; and
   a deformable section, adjoining the wire opening, that is configured to be plastically deformed to crimp the lead of the wire to the bus bar.

8. An electric motor, comprising:
   the stator assembly of claim 2; and
   a rotor disk.

9. The electric motor of claim 8, wherein the electric motor is one of an axial flux motor or a radial flux motor.

10. The stator core assembly of claim 1, wherein the insulator is embossed with a plurality of ridges to position the wire of the coil onto the core.

11. The stator core assembly of claim 10, wherein:
   the wire is wrapped around the core section in a plurality of layers, the plurality of layers comprising a first layer in direct contact with the insulator; and
   each ridge of the plurality of ridges is disposed between two neighboring portions of the wire in the first layer.

12. The stator core assembly of claim 1, further comprising:
   a bonding agent, disposed on the insulator, to at least one of increase a mechanical stiffness of the insulator or to bond the wire to the insulator.

13. The stator core assembly of claim 1, wherein:
   the flange section of the core comprises:
      a sloped lead-in portion supporting a first end of the wire; and
      a sloped lead-out portion supporting a second end of the wire; and
   the flange portion of the insulator comprises:
      a first cover tab disposed on the sloped lead-in portion and between the sloped lead-in portion and the first end of the wire; and
      a second cover tab disposed on the sloped lead-out portion and between the sloped lead-out portion and the second end of the wire.

14. The stator core assembly of claim 1, wherein:
   the wire has a diameter $D_w$; and the core section of the core has a plurality of corners, each corner of the plurality of corners having a radius of curvature $R_c$ greater than or equal to 10 $D_w$.

15. The stator core assembly of claim 1, wherein the core section of the core is shaped as a wedge.

16. The stator core assembly of claim 1, wherein the insulator has a thickness ranging between 0.005 inches and 0.062 inches.

17. The stator core assembly of claim 1, wherein the insulator comprises:
a first tab; and
a second tab fixed to the first tab, the first and second tabs maintaining a shape of the insulator that conforms with the core.

18. The stator core assembly of claim 1, wherein the insulator comprises an insulating film or a single sheet of insulating paper.

19. The stator core assembly of claim 1, wherein the insulator comprises fish paper.

20. The stator core assembly of claim 1, wherein the insulator comprises polyimide.

* * * * *